United States Patent
Chen et al.

(10) Patent No.: US 12,411,716 B2
(45) Date of Patent: *Sep. 9, 2025

(54) SERVERLESS FUNCTION COLOCATION WITH STORAGE POOLS

(71) Applicant: Red Hat, Inc., Raleigh, NC (US)

(72) Inventors: Huamin Chen, Westborough, MA (US); Noah Michael Watkins, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/994,697

(22) Filed: Nov. 28, 2022

(65) Prior Publication Data

US 2023/0100484 A1    Mar. 30, 2023

Related U.S. Application Data

(63) Continuation of application No. 16/778,855, filed on Jan. 31, 2020, now Pat. No. 11,513,860.

(51) Int. Cl.
G06F 8/10    (2018.01)
G06F 9/50    (2006.01)
G06F 9/54    (2006.01)

(52) U.S. Cl.
CPC .......... *G06F 9/5044* (2013.01); *G06F 9/5016* (2013.01); *G06F 9/542* (2013.01); *G06F 9/546* (2013.01); *G06F 2209/5011* (2013.01)

(58) Field of Classification Search
CPC ...... G06F 9/5044; G06F 9/5016; G06F 9/542; G06F 9/546; G06F 2209/5011;
(Continued)

(56) References Cited

U.S. PATENT DOCUMENTS 9,959,062 B1    5/2018 Piszczek et al.
10,613,888 B1 *  4/2020 Mentz ................... G06F 9/4401
(Continued)

FOREIGN PATENT DOCUMENTS

CN    108885582 A    11/2018
CN    110135575 A    8/2019

OTHER PUBLICATIONS

A Comprehensive View of MapReduce Aware Scheduling Algorithms in Cloud Environments; Yazdanpanah et al.; International Journal of Computer Applications (0975-8887), vol. 127-No. 6, Oct. 2015; pp. 10-15.
(Continued)

*Primary Examiner* — Kevin L Young
*Assistant Examiner* — Abdou K Seye
(74) *Attorney, Agent, or Firm* — Kilpatrick Townsend & Stockton LLP

(57) ABSTRACT

Methods and systems are provided for assigning nodes to execute functions in a serverless computing environment. In one embodiment, a method is provided that includes receiving a function for execution in a serverless computing environment and identifying a storage pool needed during execution of the function. The serverless computing environment may include nodes for executing functions and a first set of nodes may be identified that implement the storage pool. Colocation measures may be determined between the first set of nodes and a second set of nodes. Available computing resources may be determined for the second set of nodes, such as available processing cores and available memory. The second set of nodes may be ranked according to the colocation measures and the available computing resources and a first node may be selected based on the ranking. The first node may be assigned to execute the function.

20 Claims, 9 Drawing Sheets

(58) Field of Classification Search
CPC ......... G06F 2209/502; G06F 2209/503; G06F 9/5027; G06F 9/547
See application file for complete search history.

(56) References Cited

U.S. PATENT DOCUMENTS

| | | | |
|---|---|---|---|
| 10,896,060 B1* | 1/2021 | Sciarrino | G06F 9/48 |
| 2008/0288739 A1 | 11/2008 | Bamba et al. | |
| 2013/0318525 A1 | 11/2013 | Palanisamy et al. | |
| 2017/0293447 A1 | 10/2017 | Bivens et al. | |
| 2018/0011643 A1 | 1/2018 | Calder et al. | |
| 2018/0247214 A1* | 8/2018 | Ganjoo | G06Q 50/01 |
| 2018/0300173 A1* | 10/2018 | Shimamura | G06F 9/5066 |
| 2019/0034956 A1* | 1/2019 | Crosby | G06Q 30/0237 |
| 2019/0166221 A1 | 5/2019 | Shimamura et al. | |
| 2019/0205745 A1 | 7/2019 | Sridharan et al. | |
| 2019/0320040 A1* | 10/2019 | Kottapalli | H04L 67/12 |
| 2019/0384655 A1* | 12/2019 | Krishna Singuru | G06F 9/542 |
| 2020/0034484 A1* | 1/2020 | Arora | G06F 16/148 |
| 2020/0174844 A1* | 6/2020 | Bergsma | G06F 9/5077 |
| 2020/0314168 A1* | 10/2020 | Nauerz | H04L 67/1023 |
| 2021/0263779 A1* | 8/2021 | Haghighat | G06F 9/5061 |

OTHER PUBLICATIONS

An Extensivle Scheduler for the OpemLambda FaaS Platform; Totoy et al.; Mi-Move'18, Mar. 2018, Williamsburg, VA; https://doi.org/10.1145/nnnnnnn.nnnnnnn; (4 pages).
Data-Driven Serverless Functions for Object Storage; Samp et al.; Middleware '17, Dec. 11-15, 2017, Las Vegas, NV; pp. 122-133.
Hector Montaner et al. "Memscale™: A scalable environment for databases" (Year: 2011).
Marouen Mechtri et al. "Exact and Heuristic Resource Mapping Algorithms for Distributed and Hybrid Clouds" (Year: 2017).
Office Action issued in related Chinese Patent Application No. 202011601589.2, dated Sep. 20, 2023. (7 pages.).

* cited by examiner

SERVERLESS FUNCTION COLOCATION WITH STORAGE POOLS

CROSS REFERENCE TO RELATED APPLICATIONS

This application is a continuation of U.S. patent application Ser. No. 16/778,855, filed on Jan. 31, 2020, which issued as U.S. Pat. No. 11,513,860 on Nov. 29, 2022, the entire contents of which are hereby incorporated by reference.

BACKGROUND

Computing systems may rely on agile computing environments to execute one or more functions and/or to provide computing services. Agile computing environments may provide computing resources that can be used by the computing systems to execute the functions and/or computing services. In particular, the agile computing environments may allocate a portion of the computing resources (e.g., processing, storage, input/output resources) to execute requested functions and/or computing services.

SUMMARY

The present disclosure presents new and innovative systems and methods for assigning nodes to execute functions in a serverless computing environment. In one embodiment, a method is provided that includes receiving a request to execute a function in a serverless computing environment and identifying a storage pool for use during execution of the function. A first plurality of nodes of the serverless computing environment may be identified that implement the storage pool. Colocation measures may be determined between the first plurality of nodes and a second plurality of nodes of the serverless computing environment and an amount of available computing resources may be determined for at least a subset of the second plurality of nodes. The amount of available computing resources may include at least one of a quantity of available processing cores and a capacity of available memory. The subset of the second plurality of nodes may be ranked according to (i) the colocation measures and (ii) the available computing resources of the subset of the second plurality of nodes. The method may further include selecting, based on the ranking, a first node from among the subset of the second plurality of nodes and assigning the first node to execute the function.

In another embodiment, a system is provided that includes a processor and a memory. The memory may store instructions which, when executed by the processor, cause the processor to receive a request to execute a function in a serverless computing environment, identify a storage pool for use during execution of the function, and identify a first plurality of nodes of the serverless computing environment implementing the storage pool. An amount of available computing resources may be determined for at least a subset of the first plurality of nodes. The amount of available computing resources including at least one of a quantity of available processing cores and a capacity of available memory. A resource constraint may be identified for the function, and it may be determined that a first node of the subset of the first plurality of nodes has available computing resources greater than or equal to the resource constraint. The first node may be assigned to execute the function.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
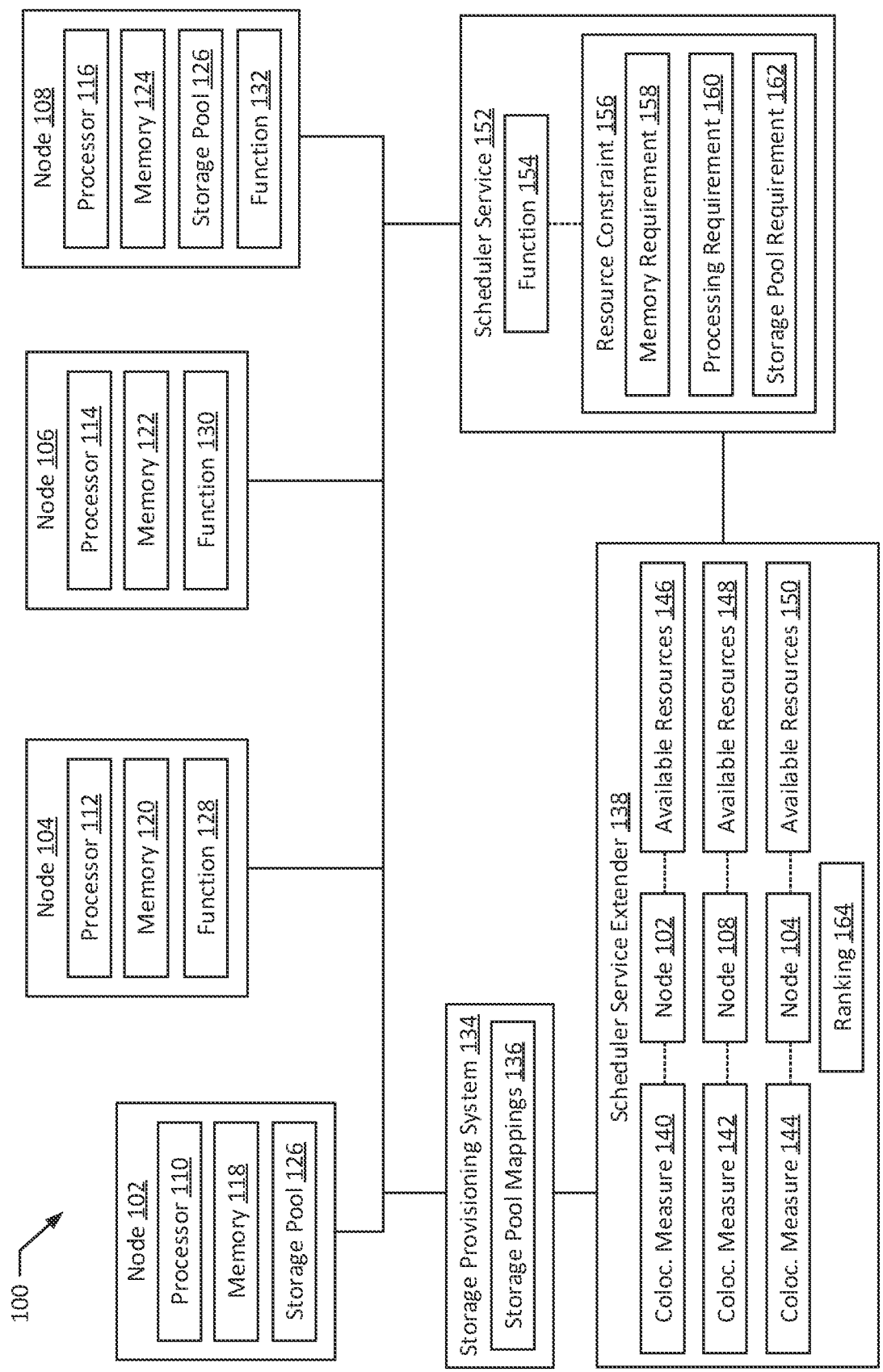
FIG. 1 illustrates a system for receiving and assigning functions to nodes for execution according to an exemplary embodiment of the present disclosure.

Computing environments such as agile computing environments that provide computing resources to other computing systems (e.g., by a cloud computing infrastructure) typically include multiple computing units with associated computing resources, such as processors, memory, hard disks, and/or graphical processing units. The computing environments may provision the computing resources from among the computing units to computing systems requesting execution of functions associated with the computing systems. To allocate the computing resources, the computing environments typically rely on virtualization. Virtualizing the computing resources may abstract the specific computing unit and/or specific piece or portion of computing hardware that a requesting computing system is allocated. Virtualization may allow functions to be split up between multiple pieces of hardware (e.g., multiple processors, multiple processor cores, multiple memories). Further, the functions may also be split up between computing hardware on different computing units. Overall, virtualization may allow computing environments to increase overall resource utilization among the computing units while also reducing the complexity for requesting computing systems, which do not have to configure the specific computing resources allocated for execution of functions. However, virtualizing computing resources can reduce overall function execution speed. For example, virtualized computing resources may typically require a greater proportion of computing resources, as fewer overall computing resources of the computing units are available for function execution. In particular, virtualization of computing resources requires a certain level of computing overhead to run and support the virtualization system, which reduces the overall availability of computing hardware and increases the latency of the computing resources of the computing units.

To address the above shortcomings of virtualized computing environments, other techniques for provisioning computing resources in a computing environment include directly provisioning specific pieces or portions of the computing hardware of the computing units (e.g., "composable infrastructure"). For example, one or more cores of a processor and/or a predefined amount of memory may be allocated to execute a specific function. In such implementations, the serverless computing environment may receive functions for execution. Certain serverless functions (e.g., functions manipulating or analyzing previously-stored data) may require access to data stored on particular storage pools. For example, serverless functions may typically lack traditional file I/O and/or may lack access to high-performance, persistent file storage. Therefore, serverless functions may store data in storage pools, which may themselves execute on particular nodes of the computing environment. The serverless functions may execute on different nodes within the computing environment and, in such instances, communication speeds and bandwidth between the serverless function and the storage pool may differ depending on how closely the node executing the serverless function is to a node implementing the storage pool. For example, if the serverless function and the storage pool are executing on the same node, communication speeds may be fast and may have a high bandwidth, allowing for faster execution of the serverless function. As another example, however, if the serverless function is executing on a node in a different data center (e.g., in a different part of the country and/or world), communication speeds may be slow and may have a low bandwidth, which may bottleneck and cause slower execution of the serverless function. Furthermore, serverless functions may typically execute quickly to perform a designated task and may then terminate (e.g., may be removed from nodes) after completing execution. For serverless functions that have to access data stored on storage pools, any increased latency in locating and/or communicating with storage pools may dramatically increase the overall execution of the serverless functions, which may be magnified over the number of times a serverless function is initialized and executed. Relatedly, because serverless functions are short-lived, traditional optimizations like caching, prefetching, and/or in-memory persistence for required data may not be available because the serverless functions are removed from the nodes after completing execution.

Therefore, there exists a need to identify the nodes that implement a storage pool to which a serverless function needs access and to identify a node located near the nodes implementing the storage pool to execute the serverless function. Typically, serverless computing environments may rely on specialized application programming interfaces that identify the nodes implementing various storage nodes and provide the information to functions themselves. For example, Hadoop® environments executing MapReduce applications typically rely on file system APIs that expose storage node information to the applications for use in selecting nodes. However, such systems create security risks, as providing storage node information to applications may enable nefarious applications to target attacks on desired storage pools. In particular, in serverless computing environments executing applications on behalf of multiple users (e.g., multiple companies and/or customers), providing storage node information to applications may enable an application executed by one user to access information stored on behalf of another user. As a result, many such serverless computing environments, such as Kubernetes® environments do not allow for applications to access storage pool information or related APIs.

One solution to this problem is to provide a service within the serverless computing environment itself that is capable of determining and analyzing network topologies of nodes within the serverless computing environment and of communicating with storage systems that monitor and assign nodes implementing storage pools. Using such a system, when a function is received that requires a particular storage pool for execution, the service can identify a first set of nodes that implement the storage pool. In certain instances, the first set of nodes may be analyzed to determine whether any of the first set of nodes have sufficient available computing resources to execute the function (e.g., to meet a resource constraint of the function). In further instances, a second set of nodes may be analyzed. For example, colocation measures may be determined between the second set of nodes and a closest node of the first set of nodes. The colocation measures may indicate a distance (e.g., a network distance) between two nodes. Available computing resources may also be determined for the second set of nodes. The second set of nodes may then be ranked based on the colocation measures and the available computing resources. A first node may then be selected from among the second set of nodes and may be assigned to execute the function.

FIG. 1 illustrates a system 100 according to an exemplary embodiment of the present disclosure. The system 100 may be configured to receive serverless functions and to assign the serverless functions to nodes for execution. In particular, the system 100 includes nodes 102, 104, 106, 108, a scheduler service 152, a scheduler service extender 138, and a storage provisioning system 134. The nodes 102, 104, 106, 108 may be configured to execute functions, e.g., on behalf of a distributed computing environment such as a cloud computing environment or serverless computing environment. For example, the nodes 104, 106, 108 as depicted are executing functions 128, 130, 132 and the nodes 102, 108 are depicted as executing a storage pool 126. In particular, the nodes 102, 104, 106, 108 may execute the functions 128, 130, 132 and/or storage pools 126 using allocated computer hardware. For example, the nodes 102, 104, 106, 108 include processors 110, 112, 114, 116 and memories 118, 120, 122, 124, which may be allocated to execute the functions 128, 130, 132 and/or storage pools 126 (e.g., according to a composable infrastructure protocol).

The scheduler service 152 may be configured to receive functions 154 and to assign a node 102, 104, 106, 108 to the function 154 for execution. For example, the scheduler service 152 may receive functions 154 from a computing device (e.g., a computing device associated with a user) and may assign the functions 154 to nodes for execution (e.g., for execution by computing resources of the nodes). The function 154 may include a resource constraint 156 that specifies one or more required resources for the function 154 to properly operate. The resource constraint 156 may include one or more of a memory requirement 158, a processing requirement 160, and a storage pool requirement 162. The memory requirement 158 may specify one or more of an amount of memory, a memory bandwidth required, and a speed of memory required for proper execution of the function 154. The processing requirement 160 may specify one or more of a quantity of processing cores (e.g., two processing cores), a type of processing cores (e.g., two CPU cores, four GPU cores), and a speed of processing cores (e.g., at least 2.50 GHZ) required for proper execution of the function 154. The storage pool requirement 162 may include one or more of an identifier of a storage pool to which the function 154 needs access and an amount of storage space required for proper execution of the function 154. The resource constraint 156 may be created by a user and/or software process of the computing device from which the function 154 is received. In certain implementations, all or part of the resource constraint 156 may be stored as part of metadata (e.g., a metadata tag and/or label) for the function 154.

The storage provisioning system 134 may be configured to assign nodes 102, 104, 106, 108 to implement storage pools 126. For example, functions 128, 130, 132 executing on the nodes 102, 104, 106, 108 may create and/or update one or more storage pools to store data (e.g., data used for multiple executions of the functions 128, 130, 132. While assigning the storage pools 126 to nodes for execution, the storage provisioning system 134 may maintain storage mappings 136. The storage mappings 136 may identify which nodes 102, 108 are executing different storage pools. In certain implementations, the storage mappings 136 may also indicate which nodes 102, 108 store particular data items in the storage pool 126 (e.g., in particular sectors of the storage pool 126). In certain implementations, the storage pools 126 may be implemented as Reliable Autonomous Distributed Object Store (RADOS) pools, such as storage clusters on the Ceph® platform. In such implementations, the storage provisioning system 134 may be implemented at least in part as a Ceph® system running within a serverless computing environment.

The scheduler service extender 138 may be configured to identify one or more nodes 102, 104, 106, 108 to which the scheduler service 152 can assign the function 154 for execution. For example, the scheduler service extender 138 may receive all or part of the storage pool mappings 136 and may determine colocation measures 140, 142, 144 for the nodes 102, 104, 106, 108 based on the storage pool mappings 136 and a network topology of the nodes 102, 104, 106, 108. In particular, the scheduler service extender 138 may determine the colocation measures 140, 142, 144 based on how close a node is to one or more nodes 102, 108 implementing the storage pool 126 within the network topology. The schedule service extender 138 may additionally determine available resources 146, 148, 150 for associated nodes 102, 108, 104. For example, the available resources 146, 148, 150 may include one or more of available processing cores, available memory capacity, and/or available storage space. The scheduler service extender 138 may recommend one or more nodes 102, 104, 106, 108 based on the colocation measures 140, 142, 144 and the available resources 146, 148, 150. For example, the scheduler service extender 138 may generate a ranking 164 of the nodes 102, 104, 106, 108 based on the colocation measures 140, 142, 144 any available resources 146, 148, 150. For example, the scheduler service extender 138 generate the ranking 164 to rank nodes 102, 104, 106, 108 with higher (or closer) colocation measures 140, 142, 144 higher. As another example, the ranking 164 may be generated to only include nodes 102, 104, 106, 108 with available resources 146, 148, 150 capable of fulfilling the resource constraint 156. The scheduler service extender 138 may provide the ranking 164 to the scheduler service 152 for use in selecting a node for execution of the function 154. Additionally or alternatively, the scheduler service extender 138 may use the ranking 164 to select a node 102, 104, 106, 108 to execute the function 154 and may transmit an indication of the selected node 102, 104, 106, 108's to the scheduler service 152.

One or more of the storage provisioning system 134, scheduler service 152, and the scheduler service extender 138 may be implemented at least in part by one or more processors and memories. For example, the memories may store instructions which, when executed by the processors, may the processors to perform one or more operational features of the storage provisioning system 134, the scheduler service 152, and/or the scheduler service extender 138. For example, in certain implementations, the scheduler service 152, the scheduler service extender 138, and/or the storage provisioning system 134 may be implemented within a serverless computing environment. As a specific example, the scheduler service 152 may be implemented as the scheduler service of a Kubernetes or similar serverless computing environment. The scheduler service extender 138 may execute in conjunction with the scheduler service 152. For example, the scheduler service extender 138 may execute as a software module of the scheduler service 152 and/or as a software module of the serverless computing environment. In certain instances, one or more of the storage provisioning system 134, the scheduler service 152, and the scheduler service extender 138 may execute within one or more nodes of the computing environment (e.g., on one or more of the nodes 102, 104, 106, 108).

Figure 2:
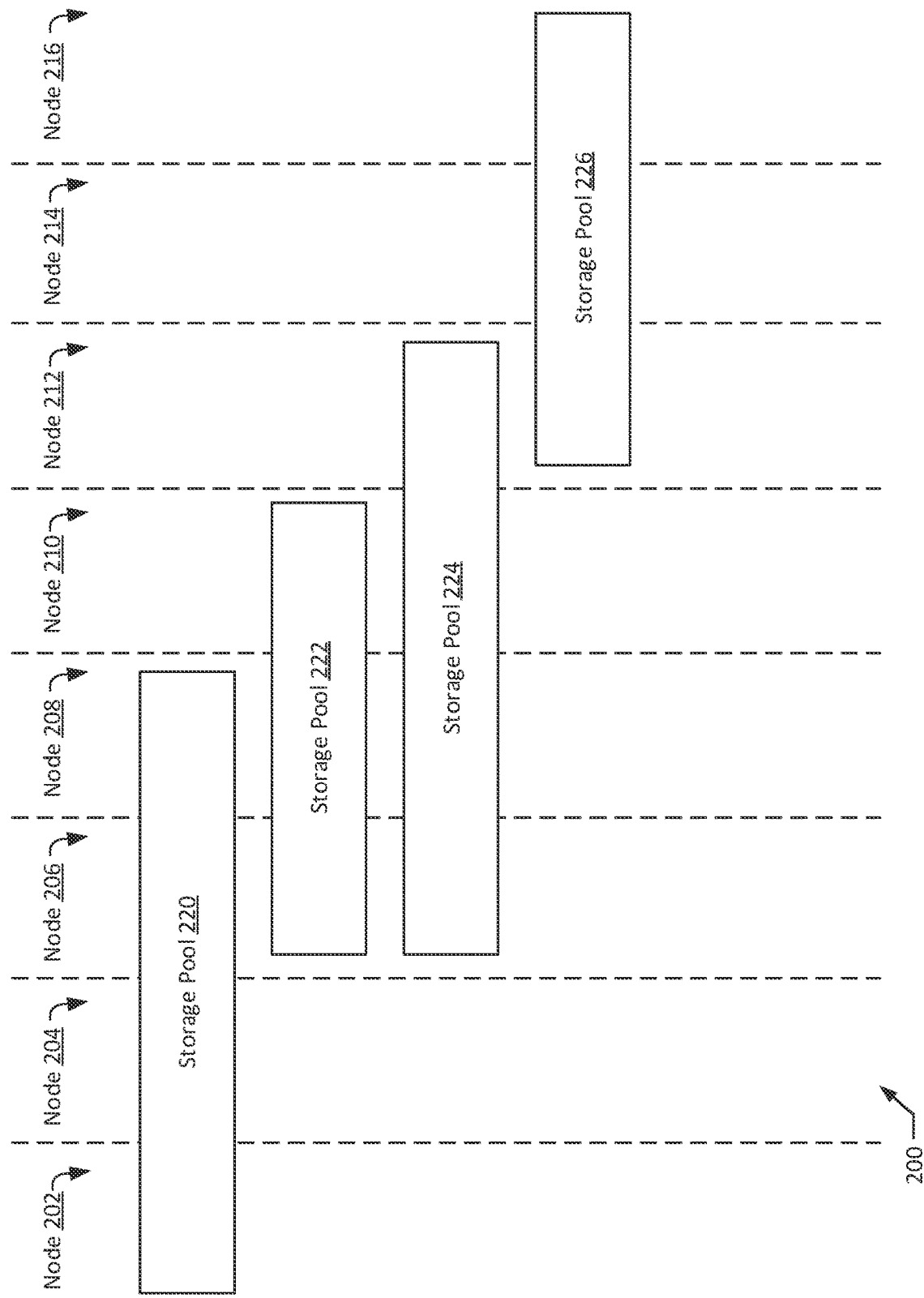
FIG. 2 illustrates a storage pool mapping according to an exemplary embodiment of the present disclosure.

FIG. 2 illustrates a storage pool mapping 200 of nodes 202, 204, 206, 208, 210, 212, 214, 216 to storage pools 220, 222, 224, 226 according to an exemplary embodiment of the present disclosure. The storage pool mapping 200 may be an exemplary implementation of the storage pool mappings 136. For example, the storage pool mapping 200 may represent a storage system managed by the storage provisioning system 134 in order to execute the storage pools 220, 222, 224, 226 on one or more nodes 202, 204, 206, 208, 210, 212, 214, 216. The storage pools 220, 222, 224, 226 may be exemplary implementations of the storage pool 126 and the nodes 202, 204, 206, 208, 210, 212, 214, 216. The nodes 202, 204, 206, 208, 210, 212, 214, 216 may be in different locations. For example, one or more of the nodes 202, 204, 206, 208, 210, 212, 214, 216 may be located in different servers, different server racks, and/or different data centers, as explained further below.

The storage pools 220, 222, 224, 226 may be configured to execute on more than one node 202, 204, 206, 208, 210, 212, 214, 216. For example, the storage pools 220, 222, 224, 226 may execute on multiple nodes 202, 204, 206, 208, 210, 212, 214, 216 to improve performance and/or availability. In particular, as depicted, the storage pool 220 executes on nodes 202, 204, 206, 208, the storage pool 222 executes on node 206, 208, 210, the storage pool 224 executes on nodes 206, 208, 210, 212, and the storage pool 226 executes on nodes 212, 214, 216. As a further example, and as explained further below in connection with FIGS. 3A-3B, nodes 202, 204, 206, 208, 210, 212, 214, 216 may execute on different servers, racks, and/or within different data centers. In such instances, the storage pools 220, 222, 224, 226 may execute on different nodes to provide greater availability of the storage pools 220, 222, 224, 226. As a specific example, the nodes 202, 204 may execute on different racks within a first data center and nodes 206, 208 may execute on different racks within a second data center. In such instances, the storage pool 220 may execute on the nodes 202, 204 to improve availability (e.g., to reduce access time) for nodes on different racks within the first data center and may execute on the nodes 206, 208 to improve availability for nodes on different racks within the second data center. As a further example, particular racks may exclusively or predominantly include different types of processors. For example, the nodes 212, 214 may execute in a rack that only includes GPUs for execution of functions, while the node 216 may execute in a rack that only includes CPUs for execution of functions. However, certain functions that access the storage pool 226 may require GPUs and other functions that access the storage pool may require CPUs. In such instances, the storage pool may execute on the nodes 212, 214, 216 such that functions executing within either rack (e.g., function requiring GPUs or functions requiring CPUs) are able to quickly access the storage pool.

In certain instances, where a storage pool 220, 222, 224, 226 executes on more than one node 202, 204, 206, 208, 210, 212, 214, 216, certain nodes 202, 204, 206, 208, 210, 212, 214, 216 may store different portions of the storage pool 220, 222, 224, 226 (e.g., different sectors and/or different data items). For example, the storage pool 220 may include 4 sectors and the node 202 may store sectors 1 and 2, the node 204 may store sectors 3 and 4, the node 206 may store sectors 1 and 3, and the node 208 may store sectors 2 and 4. In such instances, the storage pool mapping 200 may store indications of which nodes 202, 204, 206, 208, 210, 212, 214, 216 store the various sectors of the storage pools 220, 222, 224, 226.

Further, certain nodes 202, 204, 206, 208, 210, 212, 214, 216 may execute more than one storage pool 220, 222, 224, 226. For example, the nodes 206, 208 executes storage pools 220, 222, 224, the node 210 executes storage pools 222, 224, and the node 212 executes storage pools 224, 226. The storage provisioning system 134 may track and store the storage pool mapping 200 in order to record which nodes are responsible for executing each storage pool 220, 222, 224, 226. For example, the storage provisioning system 134 may store the storage pool mapping 200 as a table, array, or other data structure storing identifiers of the nodes 202, 204, 206, 208, 210, 212, 214, 216 and corresponding storage pools 220, 222, 224, 226.

Figure 3A:
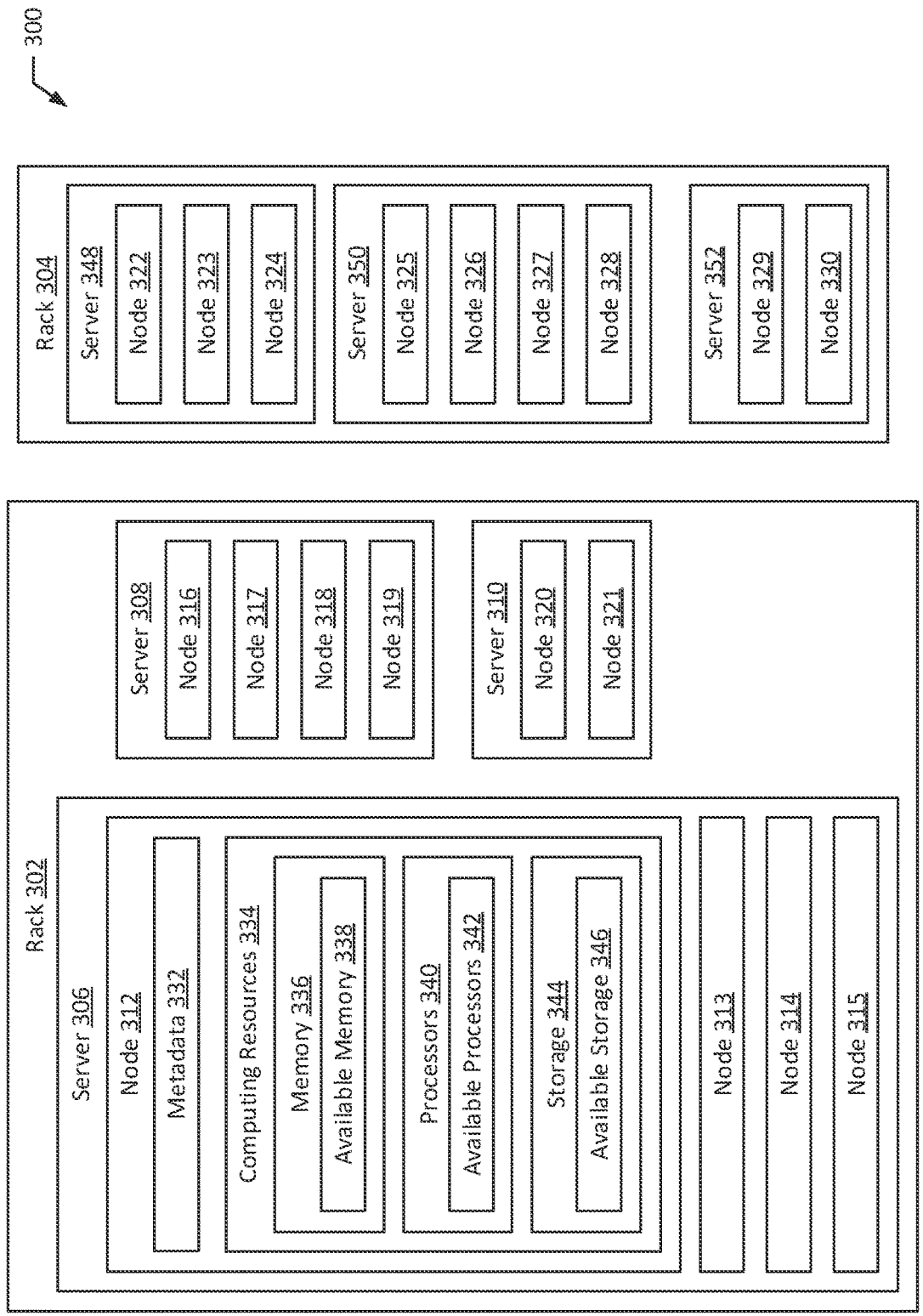
FIGS. 3A-3B illustrate network topologies according to an exemplary embodiment of the present disclosure.
Figure 3B:
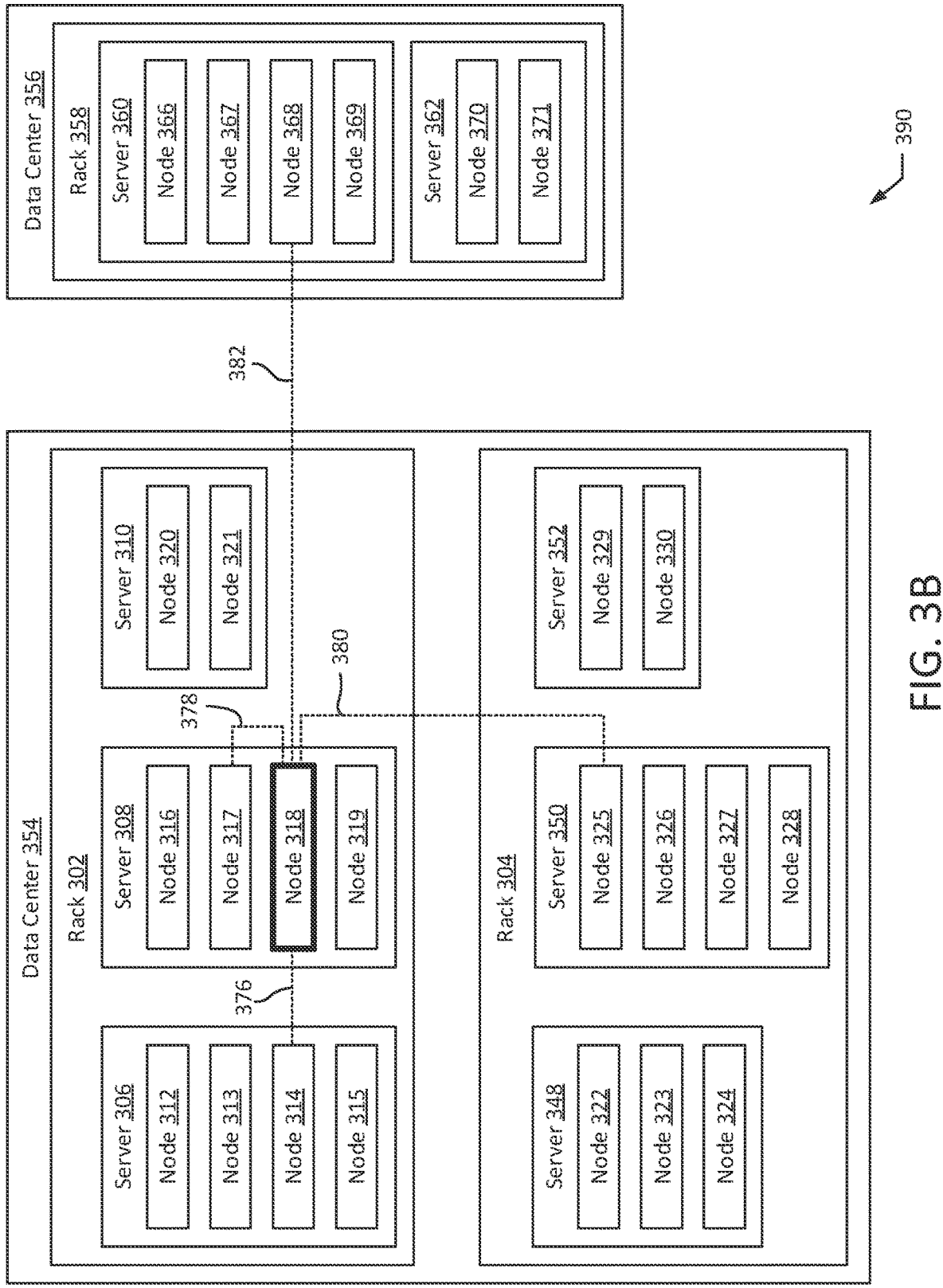

FIGS. 3A-3B illustrates network topologies 300, 390 of nodes according to an exemplary embodiment of the present disclosure. The network topologies 300, 390 may reflect network architectures of nodes within a serverless computing environment. For example, the network topology 300 includes nodes 312-330 organized into multiple servers 306, 308, 310, 348, 350, 352. In particular, nodes 312-315 are contained within server 306, nodes 316-319 are contained within server 308, and nodes 320-321 are contained within server 310. Also, nodes 322-324 are contained within server 348, nodes 325-328 are contained than server 350, and nodes 329-330 or contained within server 352. The servers 306, 308, 310, 348, 350, 352 are also organized into different racks 302, 304. In particular, servers 306, 308, 310 are contained within rack 302 and servers 348, 350, 352 are contained within rack 304. Both racks 302, 354 are contained within a data center 354, which may be a facility located in a particular geographic location that includes multiple racks of servers for the purpose of storing data and/or implementing distributed computing environments.

The node 312 includes metadata 332 and computing resources 334. The computing resources 334 include memory 336, processors 340, and storage 344. As explained above, nodes 312-330 may execute more than one function. Executing functions may utilize one or more of the computing resources 334, such as one or more cores of the processors 340, a particular capacity of memory 336, and a particular amount of storage 344. Additionally, other computing resources 334 of the nodes 312 may be utilized performing other tasks, such as administrative tasks for the serverless computing environment. As a result, the node 312 may have a certain proportion of available computing resources, including available memory 338 (e.g., available memory capacity), available processors 342 (e.g., available processing cores), and available storage 346 (e.g., available storage capacity). As explained above, such available resources may be utilized to determine whether the node 312 has sufficient computing resources to execute a function received by the scheduler service 152. The metadata 332 may store information regarding the node 312. For example, the metadata 332 may include an identifier of the node 312 (e.g., a unique identifier). Additionally or alternatively the metadata 332 may indicate information regarding the functions executing on the node 312. For example, the metadata 332 may include identifiers of one or more functions being executed on the node 312 and/or functions previously executed by the node 312. Still further implementations, the metadata 332 may store information regarding the computing resources 334, such as information regarding the available memory 338, available processors 342, and available storage 346. Although not depicted, the nodes 313-330 may similarly include metadata 332, and computing resources 334.

Each node 312-330 may correspond to one or more discrete pieces of computing hardware. For example, each node 312 may correspond to one or more discrete processors (e.g., processor chips and/or processing cores), one or more discrete memories (e.g., memory chips and/or memory capacities). The computing resources 334 associated with the nodes 312-330 may be organized into and implemented by the servers 306, 308, 310, 348, 350, 352 (e.g., according to a composable infrastructure protocol). The servers 306, 308, 310, 348, 350, 352 may be implemented as computing systems (e.g., rack-mounted computing systems) containing one or more processing chips, memory chips, storage devices used to implement the nodes 312-330 in addition to further computing resources, such as networking interfaces, input/output devices, etc. The servers 306, 308, 310, 348, 350, 352 may be stored within a rack 302, 304, such as a server rack. The rack 302, 304 may contain networking interfaces (e.g., network switches) between both the servers 306, 308, 310, 348, 350, 352 located within the rack 302, 304 but also to communicate between racks 302, 304. For example, communications from the node 312 located within the server 306 of the rack 302 to the node 322 located within the server 348 may be routed from the communication interface of the server 306 to the networking interface of the rack 302, to the networking interface of the rack 304, and then to a communication interface of the server 348.

Turning now to the network topology 390, the racks 302, 304 may further be located within a data center 354. The data center 354 may be a building located in a particular location containing multiple racks. The data center 354 may contain network interfaces used for communication with computing devices external to the data center 354 (e.g., via the Internet). For example, the network topology 390 also includes a data center 356 containing a rack 358. The rack 358 includes a server 360 containing nodes 366-369 and a server 362 containing nodes 370-371. The data center 356 may be configured similar to the data center 354. For example, the data center 356 may be part of the same serverless computing environment as the data center 354. However, the data center 356 may be located in a different location (e.g., in a different part of a country in which both the data center 354, 356 are located, in a different country than the data center 354). Accordingly, communications between the data center 354 the data center 356 may occur via the Internet.

FIG. 3B also includes indications of different types of colocation measures 376, 378, 380, 382 between the node 318 and other nodes within the network topology 390, which may be exemplary implementations of the colocation measures 140, 142, 144. In certain implementations, the colocation measures 376, 378, 380, 382 may be determined based on a network distance between the node 318 and other nodes. For example, the network distance may be closer for nodes connected via faster communication interfaces. As a specific example, the node 317 is located in the same server 308 as the node 318. Accordingly, communication between the nodes 317, 318 may occur via internal communication buses within the server 308. The node 314 is on a different server 306 within the same rack 302 as the node 318. Accordingly, communications between the nodes 314, 318 may occur via an internal networking interface (e.g., networking servers 306, 308, 310) within the rack 302. The internal networking interface may result in communications that are transmitted slower (e.g., on the order of 50-100 μsec) than communications via an internal communication bus within the server 308 (e.g., on the order of 1-10 μsec or faster). Accordingly, the network distance between the nodes 317, 318 may be lower than the network distance between the nodes 314, 318. Accordingly, the colocation measure 378 between the nodes 317, 318 may be superior (e.g., higher) than the colocation measure 376 between the nodes 314, 318. The node 325 is in a different rack 304 located within the same data center 354 as the node 318. Accordingly, communications between the nodes 318, 325 may occur via networking interfaces within the data center 354 (e.g., a local network within the data center 354). Communications via the networking interfaces of the data center 354 may be slower (e.g., on the order of 1-5 msec) than the internal networking interface of the rack 302 (e.g., on the order of 50-100 μsec). Accordingly, the network distance between the nodes 318, 325 may be higher than the network distance between the nodes 314, 318. Accordingly, the colocation measure 380 between the nodes 318, 325 may be lower than the colocation measure 376. The node 368 is located in a different data center 356 than the node 318. Accordingly, communications between the nodes 318, 368 may occur via an external network (e.g., the Internet). Communications via the external network may be slower (e.g., on the order of 10+ msec or more) than communications via networking interfaces within the data center 354. Accordingly, the network distance between the nodes 318, 368 may be higher than the network distance between the nodes 318, 325. Therefore, the colocation measure 382 between the nodes 318, 368 may be lower than the colocation measure 380.

In certain implementations, the colocation measures 376, 378, 380, 382 may be determined as particular, predefined values based on the relative locations or network distances between the nodes 314, 317, 318, 325, 368. For example, the colocation measures may be determined as a first value for nodes 317, 318 located within the same server 308, a second value for nodes 314, 318 located within the same rack 302, a third value for nodes 318, 325 located within the same data center 354, and a fourth value for nodes 318, 368 located in different data centers 354, 356. In such implementations, the first value may be greater than the second value, which may be greater than the third value, which may be greater than the fourth value. As a specific example, the first value may be 10, the second value may be 5, the third value may be 2, and the fourth value may be 1. In still further examples, a colocation measure may be determined for the node 318 itself. For example, the colocation measure for the node 318 may be a fifth value greater than the first value (e.g., 20).

In the examples discussed above and throughout the present disclosure, a higher colocation measure 376, 378, 380, 382 is discussed as being superior to lower colocation measures 376, 370, 380, 382. However, it should be understood that, in additional or alternative implementations, the colocation measures 376, 370, 380, 382 may be determined such that a lower colocation measure 376, 370, 380, 382 is superior (e.g., indicates a lower network distance).

Figure 4:
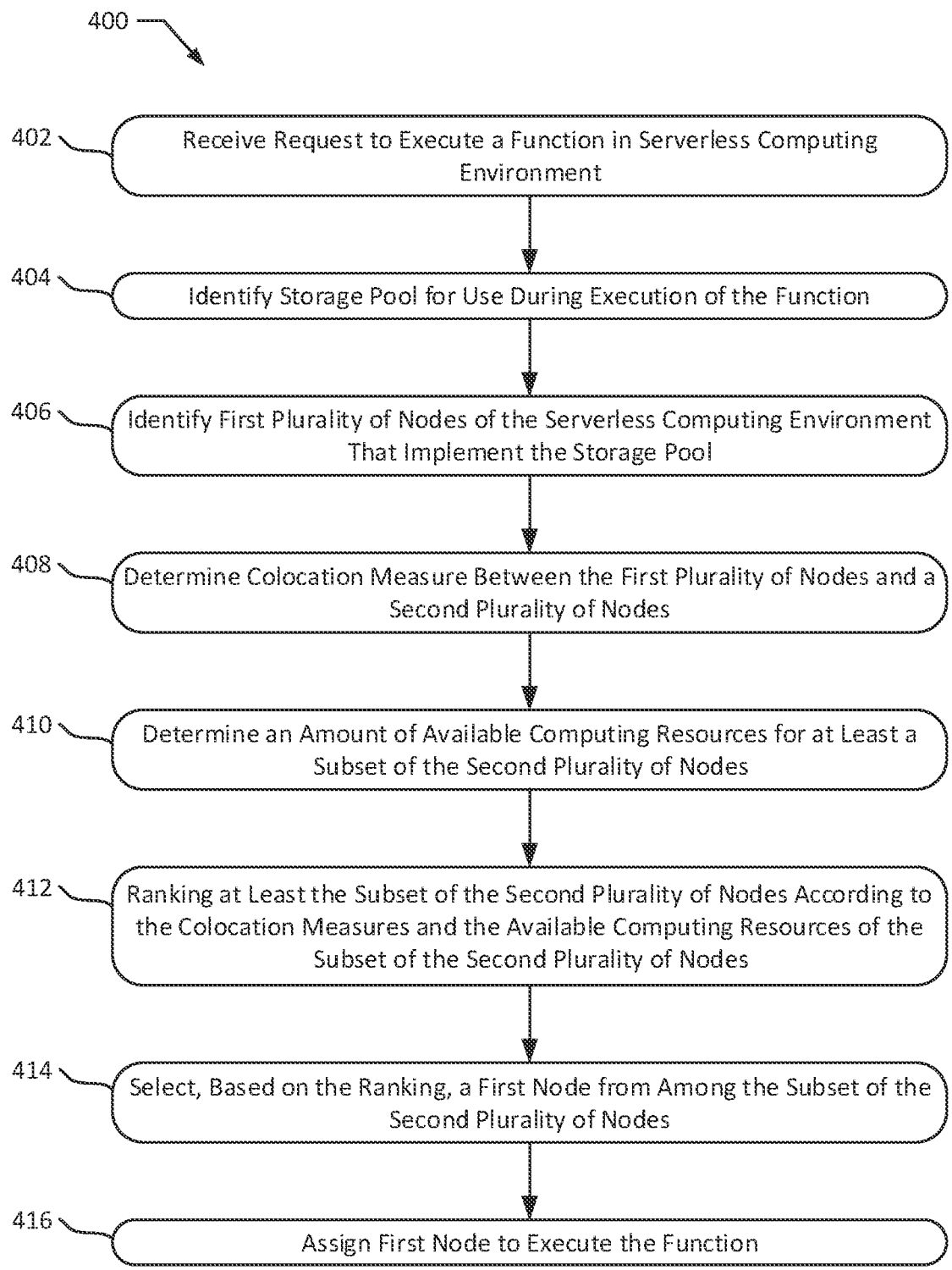
FIGS. 4-6 illustrate methods for assigning serverless functions to nodes for execution according to an exemplary embodiment of the present disclosure.

FIG. 4 illustrates a method 400 according to an exemplary embodiment of the present disclosure. The method 400 may be performed to assign serverless functions to nodes for execution. The method 400 may be implemented on a computer system, such as the system 100. For example, the method 400 may be performed at least in part by one or more of the storage provisioning system 134, the scheduler service 152, and the schedule service extender 138. The method 400 may also be implemented by a set of instructions stored on a computer readable medium that, when executed by a processor, cause the computer system to perform the method 400. For example, all or part of the method 400 may be implemented by a processor and a memory. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request to execute a function in a serverless computing environment (block 402). For example, the scheduler service 152 may receive a request to execute a function 154 in a serverless computing environment (e.g., a serverless computing environment that includes the nodes 102, 104, 106, 108). In certain implementations, the request may also include a resource constraint 156. A storage pool may be identified for use during execution of the function (block 404). For example, a storage pool 126 required for execution of the function 154 may be identified. In certain implementations, the storage pool 126 may be identified based on the resource constraint 156, such as a storage pool requirement 162 within the resource constraint 156. The storage pool 126 may store data required for execution by the function 154. For example, the function 154 may be executed to analyze data (e.g., sales data) to generate a report and/or metrics (e.g., a sales report and/or sales metrics for a predetermined period of time). The storage pool 126 may store the sales data that the function 154 will analyze when executed. In certain implementations, the storage pool requirement 162 may identify a particular portion (e.g., sector) and/or data items that the function 154 will access.

A first plurality of nodes may be identified from within the serverless computing environment may be identified that implement the storage pool (block 406). For example, the first plurality of nodes 102, 108 may be identified that implement the storage pool 126. The storage provisioning system 134 may identify the first plurality of nodes 102, 108 based on the storage pool mappings 136. For example, the storage provisioning system 134 may receive an identifier of the storage pool 126 and may identify the first plurality of nodes 102, 108 as the nodes corresponding to the storage pool 126 in the storage pool mappings 136. As a specific example, where the storage pools are implemented according to the Ceph protocol, the storage provisioning system 134 may determine and/or update the storage pool mappings 136 according to CRUSH mapping rules for storage pools. In still further implementations, the storage provisioning system 134 may identify the first plurality of nodes 102, 108 as the nodes storing the data required for execution of the function 154 (e.g., the nodes implementing a portion or sector of the storage pool that includes data items required for execution of the function).

Colocation measures may be determined between the first plurality of nodes and a second plurality of nodes (block 408). For example, the scheduler service extender 138 may determine colocation measures 140, 142, 144 between the first plurality of nodes 102, 108 and a second plurality of nodes 104, 106. As explained above, the colocation measures 140, 142, 144 may be determined based on a network distances between the first plurality of nodes 102, 108 and the second plurality of nodes 104, 106. In certain implementations, colocation measures 140, 142, 144 may be determined between each of the first plurality of nodes 102, 108 and the second plurality of nodes 104, 106. Such implementations may result in multiple location measures being determined for each of the second plurality of nodes 104, 106, and the scheduler service extender 138 may select, for each of the second plurality of nodes 104, 106, the largest colocation measure 140, 142, 144 as the corresponding colocation measure 140, 142, 144. In additional or alternative implementations, colocation measures 140, 142, 144 may be determined between the second plurality of nodes 104, 106 and a closest of the first plurality of nodes 102, 108 (e.g., a node from the first plurality of nodes with the smallest network distance). In certain implementations, the second plurality of nodes 104, 106 may be identified as the nodes 104, 106 within a predetermined network distance of the first plurality of nodes. For example, the second plurality of nodes 104, 106 may be identified as the nodes in the same server, same rack, and/or same data center as the first plurality of nodes. In certain implementations, the second plurality of nodes may include one or more of the first plurality of nodes 102, 108. In still further implementations, the second plurality of nodes may be randomly selected from among the nodes in the serverless computing environment.

An amount of available computing resources may be determined for at least a subset of the second plurality of nodes (block 410). For example, the scheduler service extender 138 may determine an amount of available resources 146, 148, 150 for all or part of the second plurality of nodes 104, 106. As explained above, the scheduler service extender 138 may determine the available resources 146, 148, 150 based on metadata 332 associated with the subset of the second plurality of nodes 104, 106. In certain implementations, the scheduler service extender 138 may determine available resources 146, 148, 150 for each of the second plurality of nodes 104, 106. In additional or alternative implementations, the scheduler service extender 138 may determine available resources 146, 148, 150 for a subset of the second plurality of nodes 104, 106. For instance, the subset of the second plurality of nodes may be identified to include nodes with a colocation measure greater than or equal to a particular threshold and/or with a network distance less than or equal to a particular threshold.

The subset of the second plurality of nodes may be ranked according to the colocation measures and be available computing resources of the subset of the second plurality of nodes (block 412). For example, the scheduler service extender 138 may generate a ranking 164 of the subset of the second plurality of nodes 104, 106 based on the colocation measures 140, 142, 144 and the available resources 146, 148, 150. For example, the scheduler service extender 138 may generate the ranking 164 by initially ranking the subset of the second plurality of nodes 104, 106 based on the colocation measures 140, 142, 144 (e.g., so that nodes with higher colocation measures 140, 142, 144 are ranked higher than nodes with lower colocation measures 140, 142, 144). In certain implementations, where one or more of the subset of the second plurality of nodes 104, 106 have identical colocation measures 140, 142, 144, the scheduler service extender 138 may further rank the nodes based on the available resources 146, 148, 150 (e.g., so that nodes with more available resources 146, 148, 150 are ranked higher than nodes with fewer available resources 146, 148, 150). While ranking the nodes based on the available resources 146, 148, 150, the scheduler service extender 138 may prioritize particular types of computing resources. For example, the scheduler service extender 138 may be configured to initially rank the nodes according to available processors 342, and may subsequently rank the nodes according to available memory 338 and/or available storage 346. In such implantations, the scheduler service extender 138 may prioritize computing resources identified within the resource constraint 156. In still further implementations, the scheduler service extender 138 may remove nodes from the subset of the second plurality of nodes with available resources 146, 148, 150 less than the resource constraints 156. For example, the scheduler service extender 138 may remove such nodes prior to ranking the nodes according to the colocation measures 140, 142, 144. In other implementations, the scheduler service extender 138 may remove nodes from the subset of the second plurality of nodes with colocation measures 140, 142, 144 greater than a predetermined threshold. For example, the scheduler service extender 138 may remove nodes with colocation measures indicating that the nodes are located within different data centers and/or different racks than the first plurality of nodes.

A first node may be selected, based on the ranking, from among the subset of the second plurality of nodes (block 414). For example, the scheduler service extender 138 and/or the scheduler service 152 may select the first node from among the subset of the second plurality of nodes 104, 106 based on the ranking 164. In particular, the first node may be selected as the highest-ranked node (or one of the highest-ranked nodes) within the ranking 164. The first node may be assigned to execute the function (block 416). For example, the scheduler service 152 may assign the first node to execute the function 154 and may transmit the function 154 to the first node for execution.

By ranking and selecting the nodes according to the colocation measures 140, 142, 144, performing the method 400 allows the system 100 to identify and assign a node located as close as possible to nodes implementing the storage pool 126 required by the function 154. As explained above, nodes located closer together are capable of communicating at faster speeds than nodes located further apart. Accordingly, the method 400 may improve the execution speed of the function 154 by enabling the function 154 to more quickly access and manipulate data stored within the storage pool 126. Furthermore, by minimizing unnecessary network communication across longer distances and additional networking interfaces, the method 400 may reduce the network bandwidth and resources utilized during execution, freeing up the network resources for use by other executing functions. Also, by ranking and selecting the nodes according to the available resources 146, 148, 150, the method 400 may enable the scheduler service 152 to assign the function 154 to the node with the most available resources, allowing for faster execution of the function 154 while also ensuring that the function 154 is executing on a node located as close as possible to nodes implementing the required storage pool.

Figure 5:
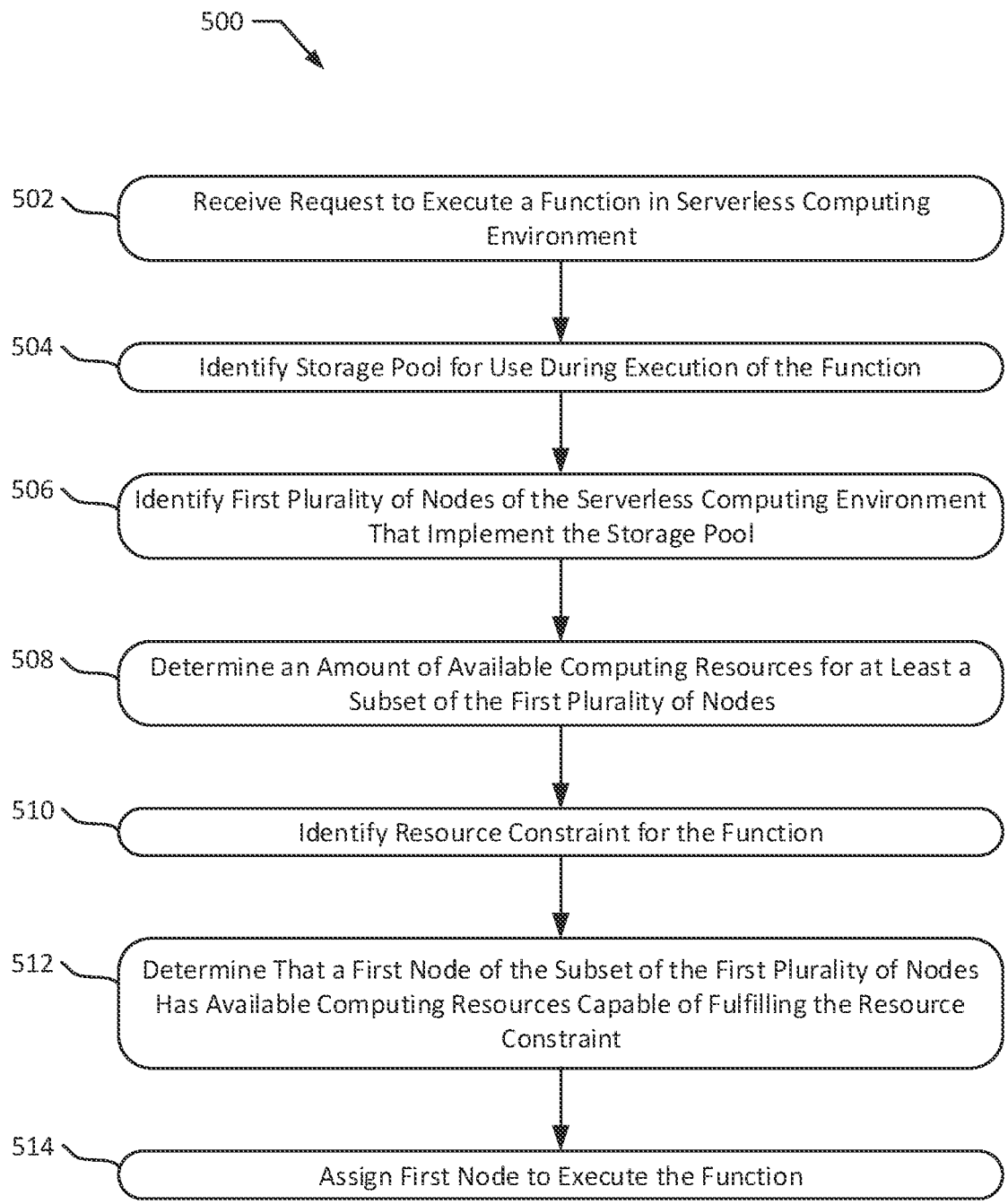

FIG. 5 illustrates a method 500 according to an exemplary embodiment of the present disclosure. The method 500 may be performed to assign serverless functions to nodes for execution. The method 500 may be implemented on a computer system, such as the system 100. For example, the method 500 may be performed at least in part by one or more of the storage provisioning system 134, the scheduler service 152, and the schedule service extender 138. The method 500 may also be implemented by a set of instructions stored on a computer readable medium that, when executed by a processor, cause the computer system to perform the method 500. For example, all or part of the method 500 may be implemented by a processor and a memory. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving a request to execute a function in a serverless computing environment (block 502). A storage pool may be identified for use during execution of the function (block 504). A first plurality of nodes of the serverless computing environment may be identified that implement the storage pool (block 506). Further, an amount of available computing resources for at least a subset of the first plurality of nodes may be identified (block 508). Blocks 502, 504, 506, 508 may be respectively implemented using techniques similar to those discussed above in connection with the blocks 402, 404, 406, 410.

A resource constraint may then be identified for the function (block 510). For example, the resource constraint 156 may be included with the request including the function 154 received by the scheduler service 152. The resource constraint 156 may include one or more of a memory requirement 158 and a processing requirement 160, as discussed above.

It may be determined that a first node of the subset of the first plurality of nodes has available computing resources capable of fulfilling the resource constraint (block 512). For example, the scheduler service extender 138 may compare the resource constraint 156 to the available resources 146, 148, 150 for the first plurality of nodes 102, 108. In particular, the available resources 146, 148, 150 may specify an available memory 338 and/or available processors 342, which the scheduler service extender 138 may compare to the memory requirement 158 and/or the processing requirement 160, respectively. Upon performing such a comparison, the scheduler service extender 138 may determine that a first node 102 has available resources 146 capable of fulfilling the memory requirement 158 and/or the processing requirement 160. For example, the scheduler service extender 138 may determine that the available memory 338 is greater than or equal to the memory requirement 158 and the available processors 342 is greater than or equal to the processing requirement 160. In certain instances, the scheduler service extender 138 may determine that more than one of the subset of the first plurality of nodes 102, 108 has available resources 146, 148, 150 capable of fulfilling the resource constraint 156. In such instances, the scheduler service extender 138 may identify the first node as the node with the greatest available resources 146, 148, 150 and/or may randomly select the first node from a nodes with sufficient available resources 146, 148, 150. The first node may then be assigned to execute the function (block 514). For example, the first node 104 may be assigned to execute the function 154 and may transmit the function 154 to the first node for execution.

Figure 6:
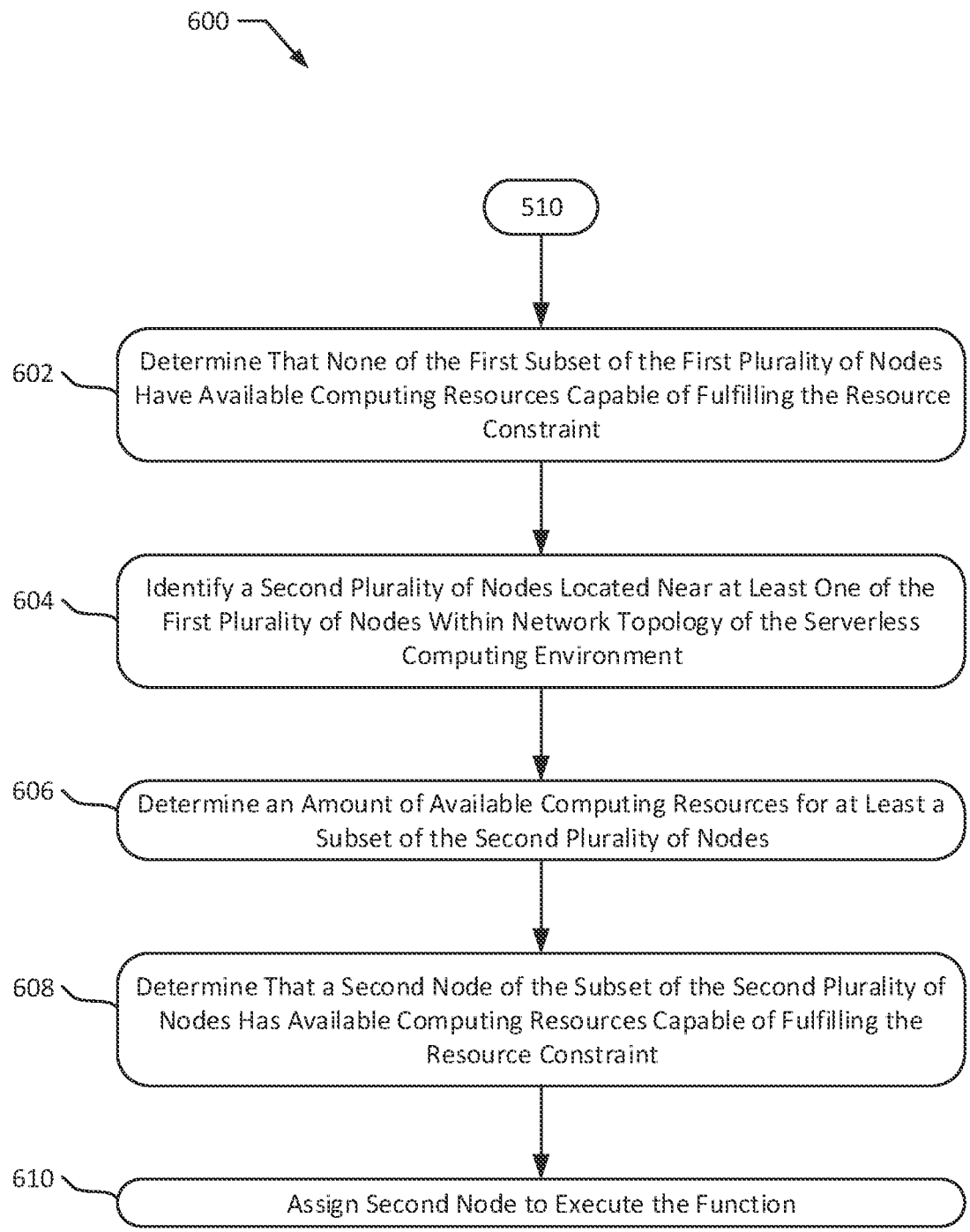

In certain instances, however, none the first plurality of nodes may have sufficient available resources sufficient to fulfill the resource constraint. In such instances, additional nodes may need to be considered. For example, in such instances, processing may proceed to block 408 of the method 400 in order to identify and analyze a second subset of nodes. As another example, FIG. 6 illustrates a method 600 according to an exemplary embodiment of the present disclosure, which may be performed to identify nodes that meet a resource constraint beyond the first plurality of node implementing a required storage pool. The method 600 may be implemented on a computer system, such as the system 100. For example, the method 600 may be performed at least in part by one or more of the storage provisioning system 134, the scheduler service 152, and the schedule service extender 138. The method 600 may also be implemented by a set of instructions stored on a computer readable medium that, when executed by a processor, cause the computer system to perform the method 600. For example, all or part of the method 600 may be implemented by a processor and a memory. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin after identifying the resource constraint at block 510 of the method 500. In particular, the method 600 may begin with determining that none of the first subset of the first plurality of nodes have available computing resources capable of fulfilling the resource constraint (block 602). For example, the scheduler service extender 138 may determine that none of the first plurality of nodes 102, 108 implementing the storage pool 126 have sufficient available resources 146, 148, 150 to fulfill the resources constraint 156. In particular, as explained above, the scheduler service extender 138 may compare available memory 338 and/or available processors 342 to the memory requirement 158 and/or the processing requirement 160. The scheduler service extender 138 may determine that none of the nodes have an available memory 338 and/or available processors 342 greater than or equal to the memory requirement 158 and/or the processing requirement 160.

A second plurality of nodes may then be identified that are located near at least one of the first plurality of nodes within a network topology of the serverless computing environment (block 604). For example, the scheduler service extender 138 may identify the second plurality of nodes 104, 106 that are located near the first plurality of nodes 102, 108 according to, e.g., a network topology 300, 390. In certain implementations, the second plurality of nodes may be identified as nodes that are located within the same server as at least one of the first plurality of nodes. For example, in the network topology 390, if the first plurality of nodes includes the node 318, the second plurality of nodes may be identified to include the nodes 316, 317, 319. In other implementations, the second plurality of nodes may be determined by randomly identifying a subset of nodes within the serverless computing environment. Colocation measures may then be determined between the subset of nodes and the first plurality of nodes and the second plurality of nodes may be identified as the nodes from the subset of the nodes with colocation measures greater than a predetermined threshold.

An amount of available computing resources may then be determined for at least a subset of the second plurality of nodes (block 606). For example, the scheduler service extender 138 may determine the amount of available computing resources for all or part of the second plurality of nodes 316, 317, 319 using techniques similar to those discussed above in connection with block 410, 508. It may then be determined that a second node of the subset of the second plurality of nodes has available computing resources capable of fulfilling the resource constraint (block 608). For example, the scheduler service extender 138 may determine that the available memory 338 and/or available processors 342 for at least one of the second plurality of nodes are greater than or equal to the memory requirement 158 and/or the processing requirement 160. The node with the higher available memory 338 and/or available processors 342 may then be identified as the second node. In instances where, the scheduler service extender 138 may determine that more than one of the subset of the second plurality of nodes 316, 317, 319 has available resources capable of fulfilling the resource constraint 156. In such instances, the scheduler service extender 138 may identify the second node as the node with the greatest available resources and/or may randomly select the second node from the nodes with sufficient available resources. The second node may then be assigned to execute the function (block 610). For example, the second node may be assigned to execute the function 154 and the scheduler service 156 may transmit the function 154 to the second node for execution.

In still further instances, none of the second plurality of nodes may have available computing resources capable of fulfilling the resource constraint at block 608. In such instances, the schedule service extender 138 may repeat blocks 604, 606 to identify a third plurality of nodes. In particular, the third plurality of nodes may be identified as nodes with a greater network distance from the first plurality of nodes. For example, the third plurality of nodes may be identified as nodes within the same rack as at least one of the first plurality of nodes. As a specific example, where the first plurality of nodes includes the node 318, the third plurality of nodes may be identified to include the nodes 312, 313, 314, 315, 320, 321. In still further implementations, none of the third plurality of nodes may have sufficient available computing resources to fulfill the resource constraint 156. Accordingly, the scheduler service extender 138 may repeat blocks 604, 606 to identify a fourth plurality of nodes located within the same data center as at least one of the first plurality of nodes. In still further instances (e.g., where none of the fourth plurality of nodes have sufficient available resources to meet the resource constraint 156), the scheduler service extender 138 may repeat blocks 604, 606 to identify a fifth plurality of nodes located within different data centers as at least one of the first plurality of nodes. In certain implementations, one or more of these steps may be omitted. For example, the second plurality of nodes may, in certain implementations, be identified to include nodes within the same rack 302 as at least one of the first plurality of nodes. As another example, the third plurality of nodes may, in certain implementations, be identified to include nodes located within the same data center as at least one of the first plurality of nodes.

By comparing the available computing resources for nodes to the resource constraints included with received functions, the methods 500, 600 may ensure that functions are assigned to nodes with sufficient computing resources to properly execute the functions. Additionally, by initially analyzing the nodes that implement the required storage pool and progressively expanding consideration to other, further nodes, the methods 500, 600 ensure that the closest possible node with sufficient available computing resources is identified and assigned to execute received functions. As explained above, executing a function in a node located near one or more nodes implementing a required storage pool increases network bandwidth, resulting in improved execution speeds and/or reduced network bandwidth usage for received functions.

Figure 7:
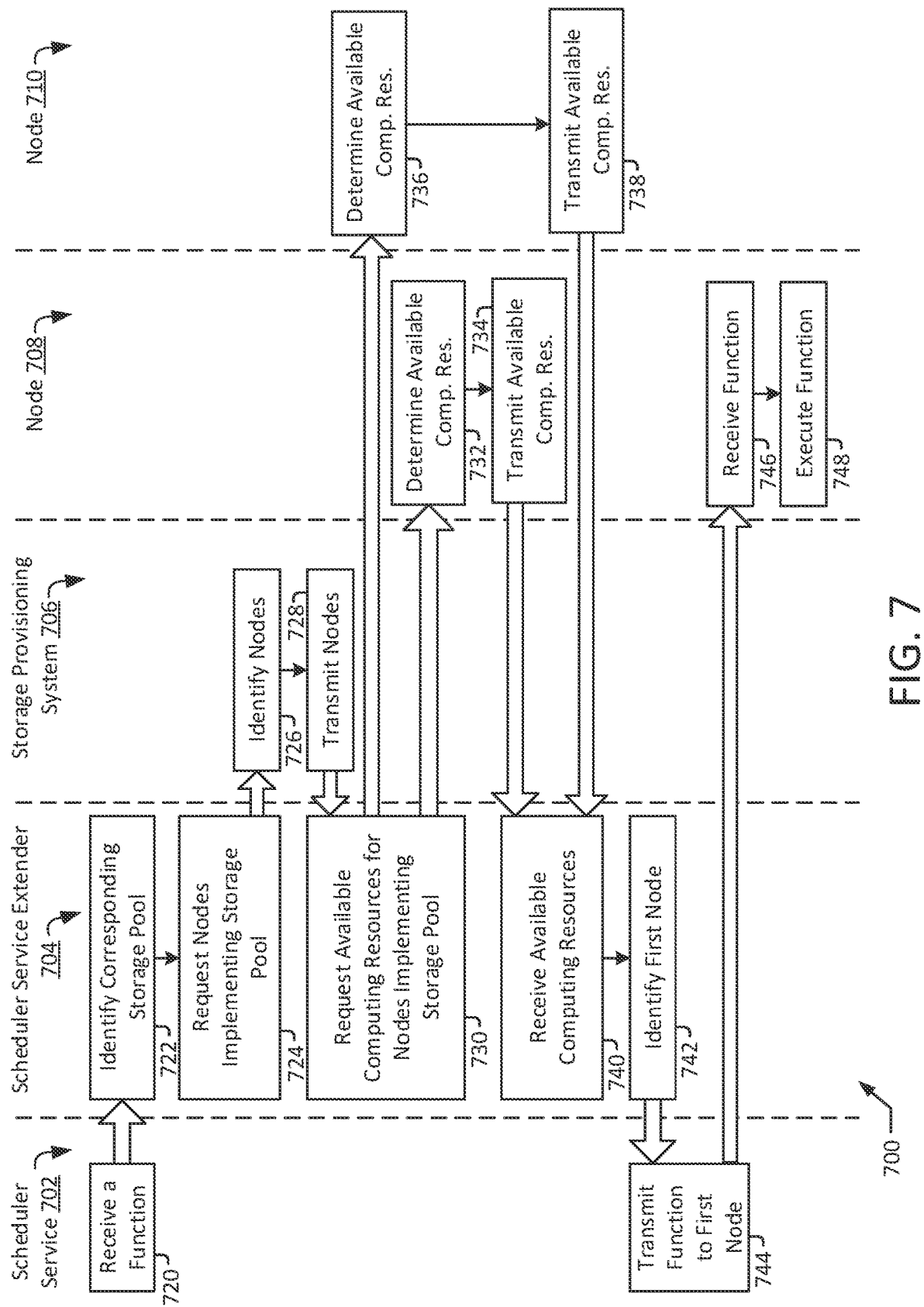
FIG. 7 illustrates a method for receiving and executing a serverless function according to an exemplary embodiment of the present disclosure.

FIG. 7 illustrates a method 700 according to an exemplary embodiment of the present disclosure. The method 700 may be performed to receive and execute a serverless function. The method 700 may be implemented on a computer system, such as the system 100. For example, the method 700 includes a scheduler service 702, a scheduler service extender, a storage provisioning system 706, and nodes 708, 710, which may respectively be exemplary implementations of the scheduler service 152, the schedule service extender 138, the storage provisioning system 134, and the nodes 708, 710. The method 700 may also be implemented by a set of instructions stored on a computer readable medium that, when executed by a processor, cause the computer system to perform the method 700. For example, all or part of the method 700 may be implemented by a processor and a memory of the scheduler service 702, the scheduler service extender 704, the storage provisioning system 706, and/or the node 708, 710. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with the scheduler service 702 receiving a function (block 720). The function may be received from another computing device, such as a computing device associated with a user and/or customer of a serverless computing environment that includes the scheduler service 702. The function may be received as part of a request that includes a resource constraint, such as a resource constraint specifying a memory requirement, a processing requirement, and/or a storage pool requirement.

The scheduler service extender 704 may identify a corresponding storage pool (block 722). For example, the scheduler service extender 704 may receive all or part of the request including the function. As a specific example, the scheduler service extender 704 may receive the storage pool requirement from the request, which may include an identifier of a storage pool that is required for proper execution of the function, and the scheduler service extender 704 may identify the corresponding storage pool based on the identifier. For example, the function may execute to transmit a copy of one or more data items from the storage pool to another computing device (e.g., to synchronize data stored across multiple computing systems). The function may therefore require access to the storage pool in order to retrieve and transmit a copy of the data items. The storage pool requirement may therefore indicate the storage pool and/or the required data items, as described above.

The scheduler service extender 704 may request the nodes implementing the storage pool (block 724). For example, the scheduler service extender may request identifiers of the nodes that implement the storage pool identified by the storage pool requirement from the storage provisioning system. In particular, the scheduler service extender may transmit an identifier of the storage pool to the storage provisioning system 706. The storage provisioning system 706 may identify the nodes (block 726) and transmit identifiers of the nodes to the scheduler service extender 704 (block 728). For example, the storage provisioning system 706 may store storage pool mappings that indicate which nodes implement various storage pools within the serverless computing environment (e.g., storage pools initialized and/or maintained by the storage provisioning system 706). The storage provisioning system 706 may identify the nodes at block 726 by determining which nodes correspond to the required storage pool within the storage pool mapping. In certain implementations, the storage pool mappings may indicate which nodes implement particular sectors and/or data items stored within the storage pool. In such instances, where the storage pool requirement identifies the sector and/or data items required, the storage provisioning system 706 may identify the nodes that implement the required sectors and/or data items within the storage pool mapping. The storage provisioning system 706 may then transmit indications of the nodes implementing the storage pool to the scheduler service extender. As an example, based on the storage pool mappings, the storage provisioning system 706 may determine that the nodes 708, 710 are implementing the storage pool required by the function. In particular, the nodes 708, 710 may implement one or more sectors storing the data items to be copied and transmitted by the function. Accordingly, the storage provisioning system 706 may transmit indications of the nodes 708, 710 to the scheduler service extender 704.

The scheduler service extender 704 may request available computing resources for the nodes implementing the storage pool (block 730). In particular, the scheduler service extender 704 may transmit requests for the available computing resources (e.g., available memory, available processors, and/or available storage space) to the nodes 708, 710 identified by the storage provisioning system 706. In response to the requests, the nodes 708, 710 may determine their available computing resources (blocks 732, 736) and may transmit indications of their available computing resources to the scheduler service extender 704 (blocks 734, 738). For example, the nodes 708, 710 may maintain information regarding available computing resources in metadata stored on the nodes 708, 710. In such instances, the nodes 708, 710 may transmit all or part of the metadata to the scheduler service extender 704 to indicate the available computing resources. In other instances, the nodes 708, 710 may query, e.g., a system controller to determine available computing resources and may transmit all or part of the result of the query to the scheduler service extender 704. In still further implementations, information regarding the available resources may be maintained by, e.g., the scheduler service 702, the scheduler service extender 704, and/or another component or service of the serverless computing environment. In such instances, the scheduler service extender 704 may request information regarding the available computing resources from the component or service storing the information.

The scheduler service extender 704 may receive the available computing resources from the nodes 708, 710 (block 740). The scheduler service extender 704 may then identify a first node from among the nodes 708, 710 implementing the storage pool (block 742). For example, the scheduler service extender 704 may analyze the available computing resources to determine whether either of the nodes 708, 710 have available computing resources capable of fulfilling a resource constraint of the function. As a specific example, the resource constraint may specify that the function needs 1 processing core, 100 MB of memory, and 1 GB of storage space. The available computing resources for the node 708 may indicate that the node 708 has 2 available processing cores, 300 MB of memory, and 10 GB of free storage space. The available computing resources for the node 710 may indicate that the node 710 has 1 available processing core, 50 MB of available memory, and 500 MB of free storage space. The scheduler service extender may therefore determine that the node 710 does not have available computing resources capable of fulfilling the resource constraint because the node 710 only has 50 MB of available memory and 500 MB of free storage space, while the function needs 100 MB of memory and 1 GB of storage space. On the other hand, the scheduler service extender 704 may determine that the node 708 has available computing resources capable of fulfilling the resource constraint because the available computing resources for the node 708 are greater than those required by the resource constraint.

The scheduler service extender 704 may transmit an identifier of the first node 708 to the scheduler service 702, which may transmit the function to the first node 708 (block 744). The first node 708 may receive and execute the function (block 746).

As explained further above in connection with the method 600, if none of the nodes 708, 710 implementing the storage pool have available computing resources capable of fulfilling the resource constraint, the scheduler service extender 704 may identify additional nodes (e.g., nodes located in the same rack, server, and/or data center as the nodes 708, 710). The scheduler service extender may then request and analyze the available computing resources of the additional nodes to determine whether any of the additional nodes have available computing resources capable of fulfilling the resource constraint.

Figure 8:
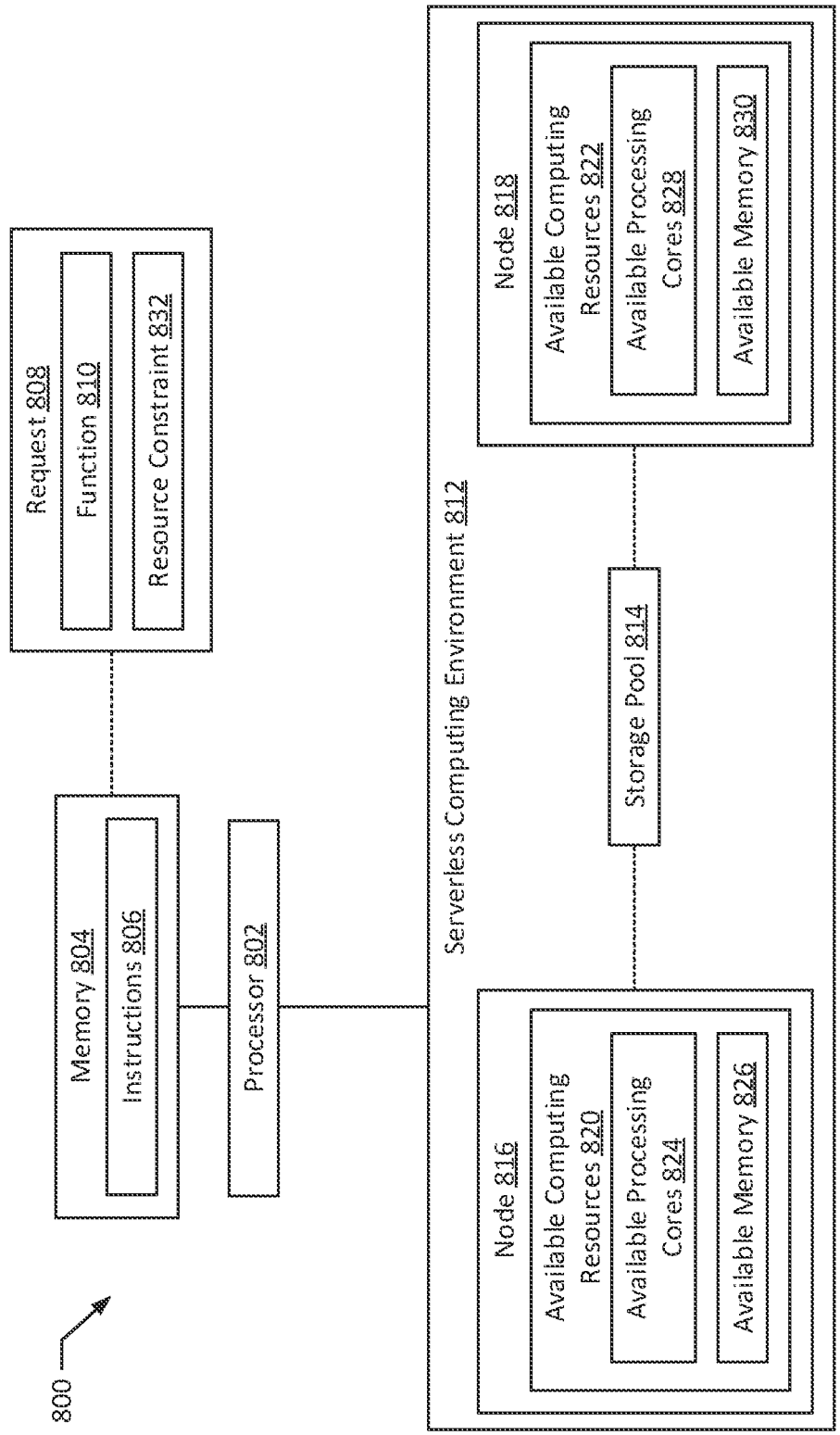
FIG. 8 illustrates a system according to an exemplary embodiment of the present disclosure.

FIG. 8 illustrates a system 800 according to an exemplary embodiment of the present disclosure. The system 800 includes a processor 802 and a memory 804. The memory 804 stores instructions 806 which, when executed by the processor 802, cause the processor 802 to receive a request to 808 execute a function 810 in a serverless computing environment 812. A storage pool 814 may be identified for use during execution of the function 810 and a first plurality of nodes 816, 818 of the serverless computing environment 812 may be identified that implement the storage pool 814. An amount of available computing resources 820, 822 may be determined for at least a subset of the first plurality of nodes 816, 818. The amount of available computing resources 820, 722 including at least one of a quantity of available processing cores 824, 828 and a capacity of available memory 826, 830. A resource constraint 832 may be identified for the function 810. It may also be determined that a first node 816 of the subset of the first plurality of nodes 816, 818 has available computing resources 820 greater than or equal to the resource constraint 832 and the first node 816 may be assigned to execute the function 810.

Aspects of the subject matter described herein may be useful alone or in combination with one or more aspects described herein. In a first aspect a method is provided that includes receiving a request to execute a function in a serverless computing environment and identifying a storage pool for use during execution of the function. A first plurality of nodes of the serverless computing environment may be identified that implement the storage pool. Colocation measures may be determined between the first plurality of nodes and a second plurality of nodes of the serverless computing environment and an amount of available computing resources may be determined for at least a subset of the second plurality of nodes. The amount of available computing resources may include at least one of a quantity of available processing cores and a capacity of available memory. The subset of the second plurality of nodes may be ranked according to (i) the colocation measures and (ii) the available computing resources of the subset of the second plurality of nodes. The method may further include selecting, based on the ranking, a first node from among the subset of the second plurality of nodes and assigning the first node to execute the function.

In a second aspect according to any of the previous aspects (e.g., the first aspect), the storage pool is one of a plurality of storage pools implemented by a storage provisioning system of the serverless computing environment. The storage provisioning system may be configured to assign nodes of the serverless computing environment to implement the plurality of storage pools.

In a third aspect according to any of the previous aspects (e.g., the second aspect), identifying the first plurality of nodes further includes transmitting an identifier of the storage pool to the storage provisioning system and receiving identifiers of the first plurality of nodes from the storage provisioning system.

In a fourth aspect according to any of the previous aspects (e.g., the first aspect), determining the colocation measures includes at least one of (i) determining a first colocation measure for nodes located in a common server machine, (ii) determining a second colocation measure for nodes located in a common server rack, (iii) determining a third colocation measure for nodes located in a common data center facility, and (iv) determining a fourth colocation measure for nodes located in different data center facilities. The first colocation measure may be less than the second colocation measure, the second colocation measure may be less than the third colocation measure, and the third colocation measure may be less than the fourth colocation measure.

In a fifth aspect according to any of the previous aspects (e.g., the first aspect), ranking at least the subset of the second plurality of nodes further includes removing nodes of the subset of the second plurality of nodes that have colocation measures greater than a predetermined value.

In a sixth aspect according to any of the previous aspects (e.g., the fifth aspect), the predetermined value is a first value. Ranking at least the subset of the second plurality of nodes may further include, prior to removing nodes, determining that all nodes of the subset of the second plurality of nodes have colocation measures greater than or equal to the first value and increasing the predetermined value from the first value to a second value greater than the first value.

In a seventh aspect according to any of the previous aspects (e.g., the first aspect), the request specifies a resource constraint of the function. Ranking at least the subset of the second plurality of nodes may include removing nodes of the subset of the second plurality of nodes with available computing resources lower than the resource constraint.

In an eighth aspect according to any of the previous aspects (e.g., the seventh aspect), selecting the first node includes selecting the first node of the subset of the second plurality of nodes with the lowest colocation measure with available computing resources greater than or equal to the resource constraint.

In a ninth aspect according to any of the previous aspects (e.g., the eighth aspect), at least two nodes of the plurality of nodes have the lowest colocation measure and available computing resources greater than or equal to the resource constraint. The first node may be selected as the node of the at least two nodes with the largest amount of available computing resources.

In a tenth aspect according to any of the previous aspects (e.g., the seventh aspect), the method further includes, prior to determining the colocation measures, determining an amount of available computing resources for at least a subset of the first plurality of nodes and determining that none of the subset of the first plurality of nodes have computing resources that are available sufficient to fulfill the resource constraint. The colocation measures may be determined in response to determining that none of the subset of the first plurality of nodes have computing resources that are available sufficient to fulfill the resource constraint.

In an eleventh aspect according to any of the previous aspects (e.g., the first aspect), the storage pool is identified based on metadata associated with at least one of the request and the function.

In a twelfth aspect, a system is provided including a processor and a memory. The memory may store instructions which, when executed by the processor, cause the processor to receive a request to execute a function in a serverless computing environment, identify a storage pool for use during execution of the function, and identify a first plurality of nodes of the serverless computing environment implementing the storage pool. Colocation measures may be determined between the first plurality of nodes and a second plurality of nodes of the serverless computing environment and an amount of available computing resources may be determined for at least a subset of the second plurality of nodes. The amount of available computing resources may include at least one of a quantity of available processing cores and a capacity of available memory. The subset of the second plurality of nodes may be ranked according to (i) the colocation measures and (ii) the available computing resources of the subset of the second plurality of nodes. A first node may be selected, based on the ranking, from among the subset of the second plurality of nodes and the first node may be assigned to execute the function.

In a thirteenth aspect according to any of the previous aspects (e.g., the twelfth aspect), the storage pool is one of a plurality of storage pools implemented by a storage provisioning system of the serverless computing environment, the storage provisioning system being configured to assign nodes of the serverless computing environment to implement the plurality of storage pools.

In a fourteenth aspect according to any of the previous aspects (e.g., the thirteenth aspect), identifying the first plurality of nodes further includes transmitting an identifier of the storage pool to the storage provisioning system and receiving identifiers of the first plurality of nodes from the storage provisioning system.

In a fifteenth aspect according to any of the previous aspects (e.g., the twelfth aspect), determining the colocation measures includes at least one of (i) determining a first colocation measure for nodes located in a common server machine, (ii) determining a second colocation measure for nodes located in a common server rack, (iii) determining a third colocation measure for nodes located in a common data center facility, and (iv) determining a fourth colocation measure for nodes located in different data center facilities, and wherein the first colocation measure is less than the second colocation measure, the second colocation measure is less than the third colocation measure, and the third colocation measure is less than the fourth colocation measure.

In a sixteenth aspect according to any of the previous aspects (e.g., the twelfth aspect), ranking at least the subset of the second plurality of nodes further includes removing nodes of the subset of the second plurality of nodes that have colocation measures greater than a predetermined value.

In a seventeenth aspect according to any of the previous aspects (e.g., the sixteenth aspect), the predetermined value is a first value and ranking at least the subset of the second plurality of nodes further includes, prior to removing nodes determining that all nodes of the subset of the second plurality of nodes have colocation measures greater than or equal to the first value and increasing the predetermined value from the first value to a second value greater than the first value.

In an eighteenth aspect according to any of the previous aspects (e.g., the twelfth aspect), the request specifies a resource constraint of the function, and ranking at least the subset of the second plurality of nodes includes removing nodes of the subset of the second plurality of nodes with available computing resources lower than the resource constraint.

In a nineteenth aspect according to any of the previous aspects (e.g., the eighteenth aspect), selecting the first node includes selecting the first node of the subset of the second plurality of nodes with the lowest colocation measure with available computing resources greater than or equal to the resource constraint.

In a twentieth aspect according to any of the previous aspects (e.g., the nineteenth aspect), at least two nodes of the plurality of nodes have the lowest colocation measure and available computing resources greater than or equal to the resource constraint. The first node may be selected as the node of the at least two nodes with the largest amount of available computing resources.

In a twenty-first aspect according to any of the previous aspects (e.g., the eighteenth aspect), the memory stores further instructions which, when executed by the processor prior to determining the colocation measures, cause the processor to determine an amount of available computing resources for at least a subset of the first plurality of nodes and determine that none of the subset of the first plurality of nodes have computing resources that are available sufficient to fulfill the resource constraint. The colocation measures may be determined in response to determining that none of the subset of the first plurality of nodes have computing resources that are available sufficient to fulfill the resource constraint.

In a twenty-second aspect according to any of the previous aspects (e.g., the twelfth aspect), the storage pool is identified based on metadata associated with at least one of the request and the function.

In a twenty-third aspect, a non-transitory, computer-readable medium storing instructions which, when executed by a processor, cause the processor to receive a request to execute a function in a serverless computing environment and identify a storage pool for use during execution of the function. A first plurality of nodes of the serverless computing environment may be identified that implement the storage pool and colocation measures may be determined between the first plurality of nodes and a second plurality of nodes of the serverless computing environment. An amount of available computing resources may be determined for at least a subset of the second plurality of nodes. The amount of available computing resources may include at least one of a quantity of available processing cores and a capacity of available memory. The subset of the second plurality of nodes may be ranked according to (i) the colocation measures and (ii) the available computing resources of the subset of the second plurality of nodes. A first node may be selected based on the ranking from among the subset of the second plurality of nodes and the first node may be assigned to execute the function.

In a twenty-fourth aspect a system is provided that includes a function assignment means configured to receive a request to execute a function in a serverless computing environment. The system may also include a storage provisioning means configured to identify a storage pool for use during execution of the function and identify a first plurality of nodes of the serverless computing environment implementing the storage pool. The function assignment means may be further configured to determine colocation measures between the first plurality of nodes and a second plurality of nodes of the serverless computing environment and determine an amount of available computing resources for at least a subset of the second plurality of nodes. The amount of available computing resources may include at least one of a quantity of available processing cores and a capacity of available memory. The function assignment means may be still further configured to rank the subset of the second plurality of nodes according to (i) the colocation measures and (ii) the available computing resources of the subset of the second plurality of nodes, select, based on the ranking, a first node from among the subset of the second plurality of nodes, and assign the first node to execute the function.

In a twenty-fifth aspect a method is provided that includes receiving a request to execute a function in a serverless computing environment and identifying a storage pool for use during execution of the function. A first plurality of nodes of the serverless computing environment may be identified that implement the storage pool and an amount of available computing resources may be determined for at least a subset of the first plurality of nodes. The amount of available computing resources may include at least one of a quantity of available processing cores and a capacity of available memory. A resource constraint may be identified for the function and a first node of the subset of the first plurality of nodes may be identified that has available computing resources greater than or equal to the resource constraint and the first node may be assigned to execute the function.

In a twenty-sixth aspect according to any of the previous aspects (e.g., the twenty-fifth aspect) the storage pool is one of a plurality of storage pools. Each of the plurality of storage pools may be implemented by a subset of nodes of the serverless computing environment, which may include the first plurality of nodes.

In a twenty-seventh aspect according to any of the previous aspects (e.g., the twenty-sixth aspect), the subset of nodes implementing each of the plurality of storage pools may be assigned by a storage provisioning system. Identifying the first plurality of nodes may be includes transmitting an identifier of the storage pool to the storage provisioning system and receiving identifiers of the first plurality of nodes.

In a twenty-eighth aspect according to any of the previous aspects (e.g., the twenty-fifth aspect), the method further includes determining that all of the subset of the first plurality of nodes have available computing resources less than the resource constraint and determining colocation measures between the first plurality of nodes and a second plurality of nodes of the serverless computing environment. At least a subset of the second plurality of nodes may be identified with colocation measures less than a predetermined threshold and an amount of available computing resources may be determined for at least a subset of the second plurality of nodes. The method may further include determining that a second node of the subset of the second plurality of nodes has available computing resources greater than or equal to the resource constraint and assigning the second node to execute the function.

In a twenty-ninth aspect according to any of the previous aspects (e.g., the twenty-eighth aspect), each of the at least the subset of the second plurality of nodes are located in at least one of the same server as at least one of the first plurality of nodes and server rack as at least one of the first plurality of nodes.

In a thirtieth aspect according to any of the previous aspects (e.g., the twenty-fifth aspect), the request includes the resource constraint for the function.

In a thirty-first aspect according to any of the previous aspects (e.g., the twenty-fifth aspect), determining that the first node of the subset of the first plurality of nodes has available computing resources greater than or equal to the resource constraint includes determining that at least two nodes of the first plurality of nodes have available computing resources greater than or equal to the resource constraint. The first node has the largest amount of available computing resources among the at least two nodes.

In a thirty-second aspect according to any of the previous aspects (e.g., the twenty-fifth aspect), the storage pool is identified based on metadata associated with at least one of the request and the function.

In a thirty-third aspect, a system is provided that includes a processor and a memory. The memory may store instructions which, when executed by the processor, cause the processor to receive a request to execute a function in a serverless computing environment, identify a storage pool for use during execution of the function, and identify a first plurality of nodes of the serverless computing environment implementing the storage pool. An amount of available computing resources may be determined for at least a subset of the first plurality of nodes. The amount of available computing resources including at least one of a quantity of available processing cores and a capacity of available memory. A resource constraint may be identified for the function, and it may be determined that a first node of the subset of the first plurality of nodes has available computing resources greater than or equal to the resource constraint. The first node may be assigned to execute the function.

In a thirty-fourth aspect according to any of the previous aspects (e.g., the thirty-third aspect), the storage pool is one of a plurality of storage pools. Each of the plurality of storage pools is implemented by a subset of nodes of the serverless computing environment and the nodes of the serverless computing environment may include the first plurality of nodes.

In a thirty-fifth aspect according to any of the previous aspects (e.g., the thirty-fourth aspect), the subset of nodes implementing each of the plurality of storage pools is assigned by a storage provisioning system. Identifying the first plurality of nodes may include transmitting an identifier of the storage pool to the storage provisioning system and receiving identifiers of the first plurality of nodes.

In a thirty-sixth aspect according to any of the previous aspects (e.g., the thirty-third aspect), the memory stores further instructions which, when executed by the processor, cause the processor to determine that all of the subset of the first plurality of nodes have available computing resources less than the resource constraint and determine colocation measures between the first plurality of nodes and a second plurality of nodes of the serverless computing environment. At least a subset of the second plurality of nodes may be identified with colocation measures less than a predetermined threshold and an amount of available computing resources may be determined for at least a subset of the second plurality of nodes. It may be determined that a second node of the subset of the second plurality of nodes has available computing resources greater than or equal to the resource constraint and the second node may be assigned to execute the function.

In a thirty-seventh aspect according to any of the previous aspects (e.g., the thirty-sixth aspect) each of the at least the subset of the second plurality of nodes are located in at least one of the same server as at least one of the first plurality of nodes and server rack as at least one of the first plurality of nodes.

In a thirty-eighth aspect according to any of the previous aspects (e.g., the thirty-third aspect), the request includes the resource constraint for the function.

In a thirty-ninth aspect according to any of the previous aspects (e.g., the thirty-third aspect), determining that the first node of the subset of the first plurality of nodes has available computing resources greater than or equal to the resource constraint includes determining that at least two nodes of the first plurality of nodes have available computing resources greater than or equal to the resource constraint. The first node has the largest amount of available computing resources among the at least two nodes.

In a fortieth aspect according to any of the previous aspects (e.g., the thirty-third aspect), the storage pool is identified based on metadata associated with at least one of the request and the function.

In a forty-first aspect, a non-transitory, computer-readable medium storing instructions which, when executed by a processor, cause the processor to receive a request to execute a function in a serverless computing environment, identify a storage pool for use during execution of the function, and identify a first plurality of nodes of the serverless computing environment implementing the storage pool. An amount of available computing resources may be determined for at least a subset of the first plurality of nodes. The amount of available computing resources may include at least one of a quantity of available processing cores and a capacity of available memory. A resource constraint may be identified for the function and it may be determined that a first node of the subset of the first plurality of nodes has available computing resources greater than or equal to the resource constraint. The first node may be assigned to execute the function.

In a forty-second aspect, a system is provided that includes a function assignment means configured to receive a request to execute a function in a serverless computing environment. The system may further include a storage provisioning means configured to identify a storage pool for use during execution of the function and identify a first plurality of nodes of the serverless computing environment implementing the storage pool. The function assignment means are further configured to determine an amount of available computing resources for at least a subset of the first plurality of nodes. The amount of available computing resources may include at least one of a quantity of available processing cores and a capacity of available memory. The function assignment means may be still further configured to identify a resource constraint for the function, determine that a first node of the subset of the first plurality of nodes has available computing resources greater than or equal to the resource constraint, and assign the first node to execute the function.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   determining, by a scheduler service, colocation measures indicative of distances between a first plurality of nodes and a second plurality of nodes using a network topology of a serverless computing environment that includes the first plurality of nodes and the second plurality of nodes, the first plurality of nodes implementing a storage pool which provides persistent storage of previously stored data that a function accesses and manipulates during execution of the function in the serverless computing environment;
   determining, by the scheduler service, an amount of available computing resources for at least a subset of the second plurality of nodes, wherein the subset includes nodes with a colocation measure equal to or greater than a predetermined threshold, the amount including a quantity of available processing cores or a capacity of available memory;
   receiving, by the scheduler service, a ranking of the subset, wherein the ranking ranks the subset according to the colocation measures and the available computing resources of the subset, wherein nodes of the subset which are less distance from the first plurality of nodes according to the colocation measures are ranked higher; and
   in response to receiving the ranking, assigning, by the scheduler service, at least one first node from the subset to execute the function based on the ranking, wherein the at least one first node comprises a highest-ranked node in the ranking of the subset; and
   executing, by the scheduler service, the function on the at least one first node, the at least one first node accessing the data stored on the first plurality of nodes during execution of the function.

2. The method of claim 1, wherein the storage pool is one of a plurality of storage pools implemented by a storage provisioning system of the serverless computing environment, the storage provisioning system being configured to assign nodes of the serverless computing environment to implement the plurality of storage pools.

3. The method of claim 2, further comprising identifying the first plurality of nodes by:
   transmitting an identifier of the storage pool to the storage provisioning system; and
   receiving identifiers of the first plurality of nodes from the storage provisioning system.

4. The method of claim 1, wherein determining the colocation measures includes at least one of determining a first colocation measure for nodes located in a common server, determining a second colocation measure for nodes located in a common server rack, determining a third colocation measure for nodes located in a common data center, or determining a fourth colocation measure for nodes located in different data centers, and wherein the first colocation measure is less than the second colocation measure, the second colocation measure is less than the third colocation measure, and the third colocation measure is less than the fourth colocation measure.

5. The method of claim 1, further comprising removing nodes of the subset that have colocation measures greater than a predetermined value from the ranking.

6. The method of claim 5, wherein the predetermined value is a first value and wherein the method further comprises, prior to removing nodes:
   determining that all nodes of the subset have colocation measures greater than or equal to the first value; and
   increasing the predetermined value from the first value to a second value greater than the first value.

7. The method of claim 1, wherein a request specifies a resource constraint of the function, and wherein the method includes removing nodes of the subset with available computing resources lower than the resource constraint from the ranking.

8. The method of claim 7, further comprising selecting the at least one first node by selecting one or more nodes of the subset with colocation measures lower than a threshold and with available computing resources greater than or equal to the resource constraint.

9. The method of claim 8, wherein at least two nodes of the second plurality of nodes have colocation measures lower than the threshold and available computing resources greater than or equal to the resource constraint, the at least two nodes being more nodes than the at least one first node, and wherein the at least one first node is selected from the at least two nodes as having the largest amount of available computing resources.

10. The method of claim 1, wherein the at least one first node includes one to four nodes.

11. The method of claim 1, further comprising, prior to determining the colocation measures:
    determining an amount of available computing resources for at least a subset of the first plurality of nodes; and
    determining that none of the subset of the first plurality of nodes have computing resources that are available sufficient to fulfill a resource constraint,
    wherein the colocation measures are determined in response to determining that none of the subset of the first plurality of nodes have computing resources that are available sufficient to fulfill the resource constraint.

12. A system comprising:
    a processor; and
    a memory storing instructions which, when executed by the processor, cause the processor to:
    determine, by a scheduler service, colocation measures indicative of distances between a first plurality of nodes and a second plurality of nodes using a network topology of a serverless computing environment that includes the first plurality of nodes and the second plurality of nodes, the first plurality of nodes implementing a storage pool which provides persistent storage of previously stored data that a function accesses and manipulates during execution of the function in the serverless computing environment;
    determine, by the scheduler service, an amount of available computing resources for at least a subset of the second plurality of nodes, wherein the subset includes nodes with a colocation measure equal to or greater than a predetermined threshold, the amount including a quantity of available processing cores or a capacity of available memory;

receive, by the scheduler service, a ranking of the subset, wherein the ranking ranks the subset according to the colocation measures and the available computing resources of the subset, wherein nodes of the subset which are less distance from the first plurality of nodes according to the colocation measures are ranked higher; and in response to receiving the ranking, assign, by the scheduler service, at least one first node from the subset to execute the function based on the ranking, wherein the at least one first node comprises a highest-ranked node in the ranking of the subset; and execute, by the scheduler service, the function on the at least one first node, the at least one first node accessing the data stored on the first plurality of nodes during execution of the function.

13. The system of claim 12, wherein the storage pool is one of a plurality of storage pools, wherein each of the plurality of storage pools is implemented by a subset of nodes of the serverless computing environment, the nodes of the serverless computing environment including the first plurality of nodes.

14. The system of claim 13, wherein the subset of nodes implementing each of the plurality of storage pools is assigned by a storage provisioning system, and wherein the processor identifies the first plurality of nodes by:
transmitting an identifier of the storage pool to the storage provisioning system; and
receiving identifiers of the first plurality of nodes.

15. The system of claim 12, wherein the memory stores further instructions which, when executed by the processor, cause the processor to:
determine that all of a subset of the first plurality of nodes have available computing resources less than a resource constraint.

16. The system of claim 15, wherein each of the subset of the second plurality of nodes are located in at least one of the same server as at least one of the first plurality of nodes or server rack as at least one of the first plurality of nodes.

17. The system of claim 12, wherein a received request includes a resource constraint for the function.

18. The system of claim 12, wherein the memory stores further instructions which, when executed by the processor, cause the processor to:
remove nodes of the subset with available computing resources lower than a resource constraint from the ranking.

19. The system of claim 12, wherein the storage pool is identified based on metadata associated with at least one of a request or the function.

20. A non-transitory, computer-readable medium storing instructions which, when executed by a processor, cause the processor to:
determine, by a scheduler service, colocation measures indicative of distances between a first plurality of nodes and a second plurality of nodes using a network topology of a serverless computing environment that includes the first plurality of nodes and the second plurality of nodes, the first plurality of nodes implementing a storage pool which provides persistent storage of previously stored data that a function accesses and manipulates during execution of the function in the serverless computing environment;

determine, by the scheduler service, an amount of available computing resources for at least a subset of the second plurality of nodes, wherein the subset includes nodes with a colocation measure equal to or greater than a predetermined threshold, the amount including a quantity of available processing cores or a capacity of available memory;

receive, by the scheduler service, a ranking of the subset, wherein the ranking ranks the subset according to the colocation measures and the available computing resources of the subset, wherein nodes of the subset which are less distance from the first plurality of nodes according to the colocation measures are ranked higher; and in response to receiving the ranking, assign, by the scheduler service, at least one first node from the subset to execute the function based on the ranking, wherein the at least one first node comprises a highest-ranked node in the ranking of the subset; and execute, by the scheduler service, the function on the at least one first node, the at least one first node accessing the data stored on the first plurality of nodes during execution of the function.

* * * * *